May 10, 1960 F. C. DENTON 2,935,957

BULB PLANTER

Filed Sept. 14, 1955 15 Sheets-Sheet 1

INVENTOR,
FRANK C. DENTON

BY Eaton + Bell

ATTORNEYS

May 10, 1960 F. C. DENTON 2,935,957

BULB PLANTER

Filed Sept. 14, 1955 15 Sheets-Sheet 2

INVENTOR:
FRANK C. DENTON

BY Eaton + Bell

ATTORNEYS

May 10, 1960 F. C. DENTON 2,935,957

BULB PLANTER

Filed Sept. 14, 1955 15 Sheets-Sheet 3

FRANK C. DENTON,
INVENTOR

By Eaton + Bell

ATTORNEYS

May 10, 1960 F. C. DENTON 2,935,957

BULB PLANTER

Filed Sept. 14, 1955 15 Sheets-Sheet 4

FRANK C. DENTON,
INVENTOR

BY Eaton + Bell

ATTORNEYS

May 10, 1960 F. C. DENTON 2,935,957

BULB PLANTER

Filed Sept. 14, 1955 15 Sheets-Sheet 5

INVENTOR,
FRANK C. DENTON

By Eaton + Bell

ATTORNEYS

May 10, 1960 F. C. DENTON 2,935,957

BULB PLANTER

Filed Sept. 14, 1955 15 Sheets-Sheet 6

FRANK C. DENTON,
INVENTOR.

BY Eaton + Bell

ATTORNEYS

May 10, 1960 F. C. DENTON 2,935,957

BULB PLANTER

Filed Sept. 14, 1955 15 Sheets-Sheet 7

FRANK C. DENTON,
INVENTOR.

BY Eaton + Bell

ATTORNEYS

May 10, 1960 F. C. DENTON 2,935,957
BULB PLANTER
Filed Sept. 14, 1955 15 Sheets-Sheet 8
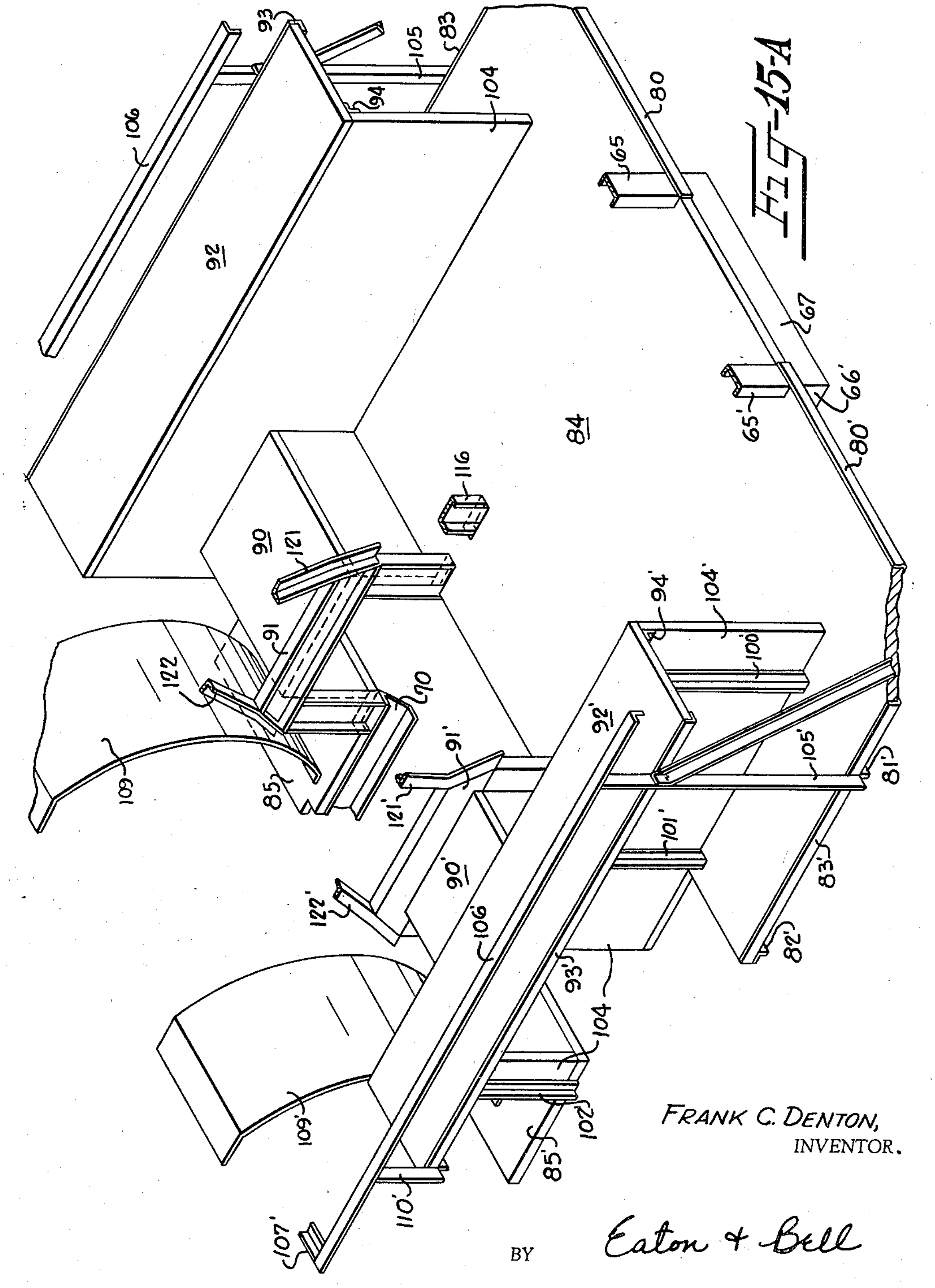
FIG-15-A
FRANK C. DENTON,
INVENTOR.
BY Eaton & Bell
ATTORNEYS May 10, 1960 F. C. DENTON 2,935,957

BULB PLANTER

Filed Sept. 14, 1955 15 Sheets-Sheet 9

INVENTOR:
FRANK C. DENTON.

BY *Eaton & Bell*

ATTORNEYS

May 10, 1960 F. C. DENTON 2,935,957

BULB PLANTER

Filed Sept. 14, 1955 15 Sheets-Sheet 10

INVENTOR:
FRANK C. DENTON

BY Eaton & Bell

ATTORNEYS

May 10, 1960 F. C. DENTON 2,935,957

BULB PLANTER

Filed Sept. 14, 1955 15 Sheets-Sheet 11

INVENTOR:
FRANK C. DENTON.

BY Eaton + Bell

ATTORNEYS

May 10, 1960 F. C. DENTON 2,935,957

BULB PLANTER

Filed Sept. 14, 1955 15 Sheets-Sheet 12

INVENTOR:
FRANK C. DENTON

BY Eaton + Bell

ATTORNEYS

May 10, 1960

F. C. DENTON 2,935,957

BULB PLANTER

Filed Sept. 14, 1955

15 Sheets-Sheet 13

INVENTOR:
FRANK C. DENTON

BY Eaton & Bell

ATTORNEYS

May 10, 1960

F. C. DENTON 2,935,957

BULB PLANTER

Filed Sept. 14, 1955

15 Sheets-Sheet 14

INVENTOR:
FRANK C. DENTON

BY Eaton & Bell

ATTORNEYS

INVENTOR:
FRANK C. DENTON

BY Eaton + Bell
ATTORNEYS

United States Patent Office 2,935,957

Patented May 10, 1960

2,935,957

BULB PLANTER

Frank C. Denton, Hendersonville, N.C., assignor of fifty percent to Eaton, Bell, Hunt & Seltzer, Charlotte, N.C., a partnership Application September 14, 1955, Serial No. 534,312

20 Claims. (Cl. 111—3)

This invention relates to farm machinery or agricultural machinery and, more especially, to a machine or implement which may be self-propelled or tractor-drawn for planting rows of spaced botanical bulbs or analogous objects in the earth or soil.

In the planting of botanical bulbs, it is preferable that they are arranged in substantially uniform relationship and in parallel rows and that they are buried in the soil in uniform depth with the stems thereof facing upwardly and the root ends thereof facing downwardly. Heretofore, all of the operations involved in planting such bulbs have been performed by hand and it is an object of this invention to provide a machine or implement which forms a ditch or furrow in the soil as it moves along the ground and successively presses bulbs in uniformly spaced relationship in the furrow by a simulated finger tip pressure and, in so doing, automatically positions the stems of the bulbs so they face upwardly and covers the bulbs thus positioned in the furrow with the earth or soil displaced during formation of the furrow.

It is another object of this invention to provide a machine or implement of the character discribed comprising a hopper for containing a supply of botanical bulbs and a pair of spaced parallel endless conveyor belts having spaced pockets therein. The bottom or lower runs of the conveyor belts are positioned adjacent the mean level of the upper surface of the soil and are alined with respective furrow forming devices or ploughs and means are provided for successively transferring bulbs from the hopper to successive pockets in the upper runs of the conveyor belts. The latter means also includes means for automatically inverting any bulbs whose stem portions face upwardly to that the stems of all bulbs are transferred into pockets in the upper reaches or runs of the conveyor belts to face downwardly.

Thus, with subsequent movement of the bulbs with the lower or bottom runs of the conveyor belts, the stems thereof face upwardly so they are deposited from the corresponding pockets onto the bottom of the corresponding furrows in predetermined spaced relationship with their stems facing upwardly. A suitable furrow covering or earth or soil displacing means is spaced rearwardly of the point at which the bulbs are permitted to be moved out of the pockets of the lower runs of each of the conveyor belts to thereby uniformly cover the bulbs with soil.

It is still another object of this invention to provide a bulb planter of the character described which is provided with ground wheels having connections with the conveyor belts for driving the same at the same surface speed which the machine or implement is moved over the ground.

It is another object of this invention to provide a bulb planter of the character last described wherein means are provided for engaging and disengaging the mechanical connections between the conveyor belts and the ground wheels and it is still another object of this invention to provide means for raising and lowering the conveyor belts relative to the ground wheels whereby the conveyor belts may be raised substantially above the level of the lower surfaces of the ground wheels when the implement is being transported from one place to another or being turned around at the end of each row of planted bulbs.

Some of the objects of the invention having been stated, other objects will appear as the description proceeds when taken in connection with the accompanying drawings, in which—

Figures 1, 2, 3:
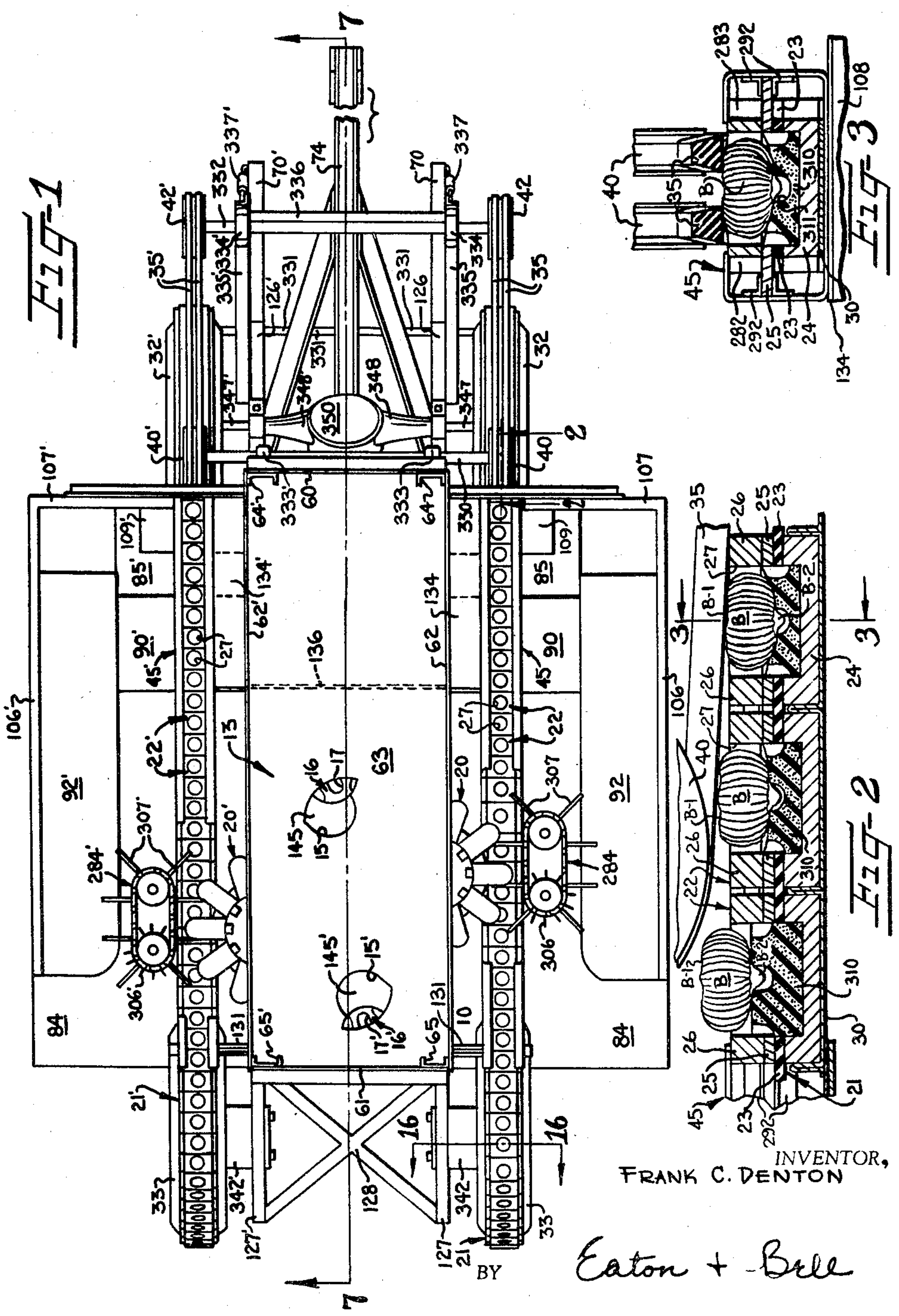
Figure 1 is a top plan view of the improved bulb planter.
Figure 2 is an enlarged fragmentary vertical sectional view through the upper reach of one of the conveyors taken substantially along line 2—2 in Figure 1.
Figure 3 is a fragmentary transverse vertical sectional view taken substantially along line 3—3 in Figure 2.
Figure 6:
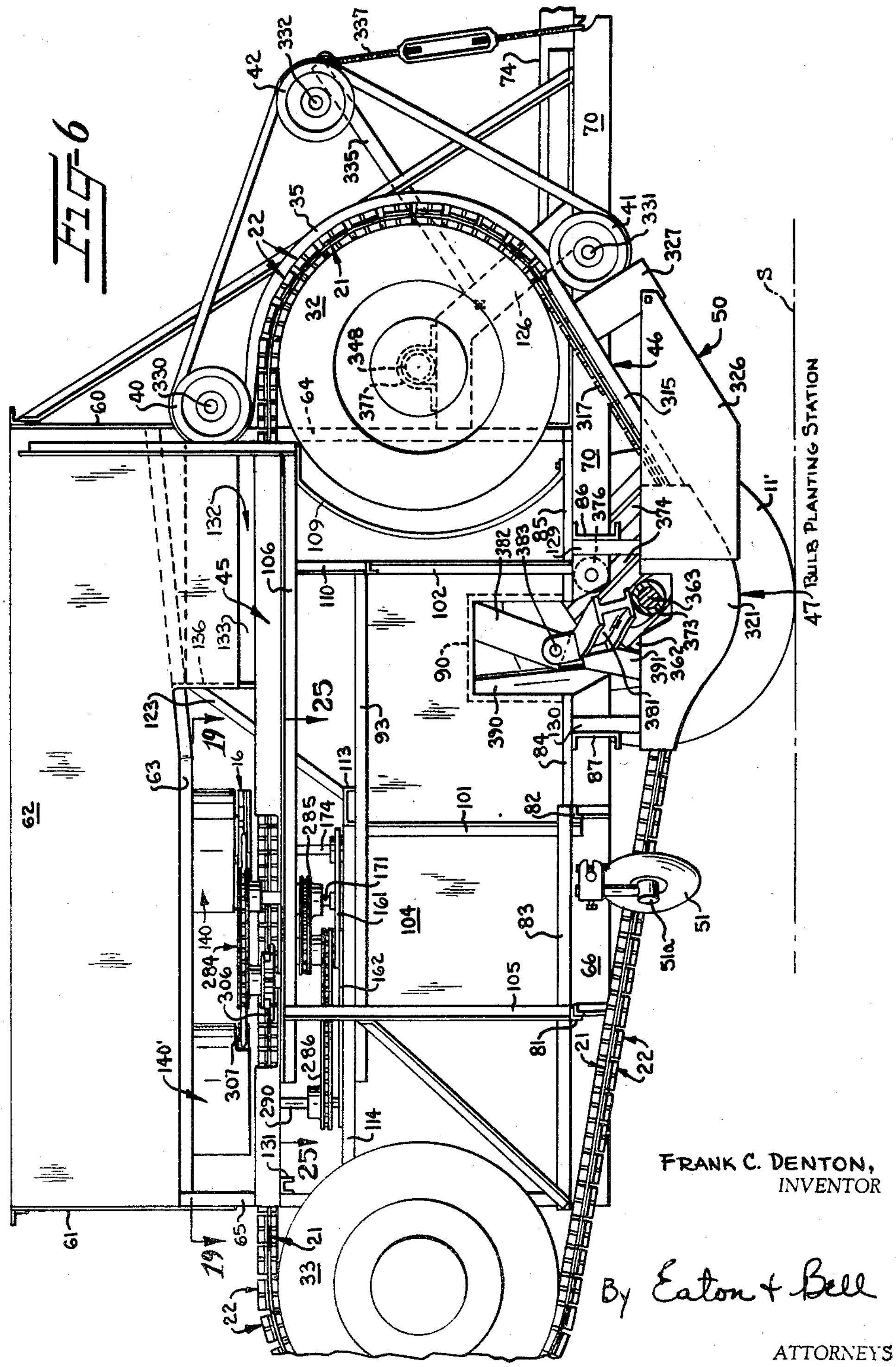
Figure 6 is an enlarged right-hand side elevation of the machine looking at the right-hand side of Figure 5 with the right-hand wheel removed for purposes of clarity.
Figures 15, 16:
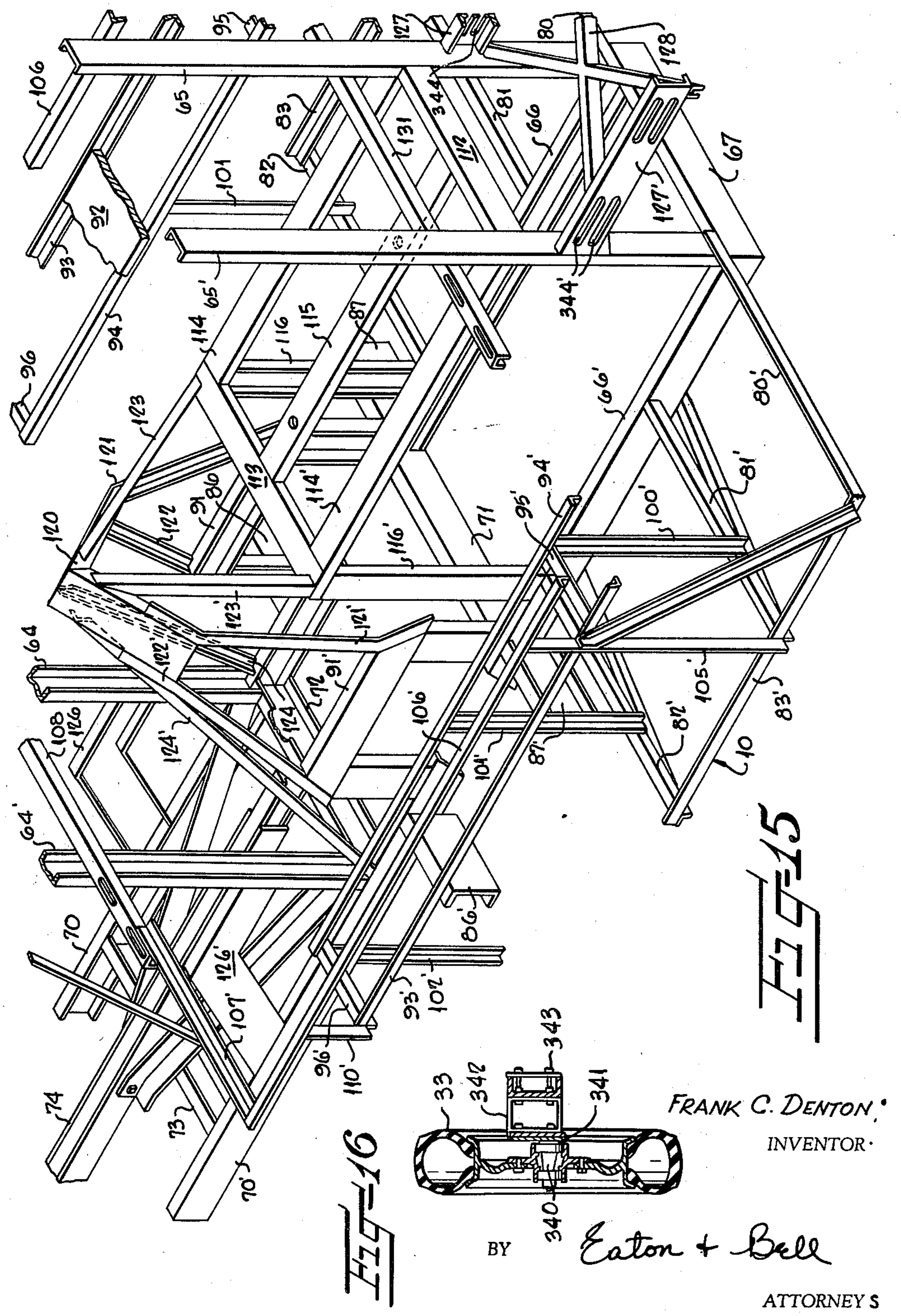
Figure 15 is an isometric view of the skeleton or framework of the machine with parts broken away and other parts omitted.
Figures 17, 18:
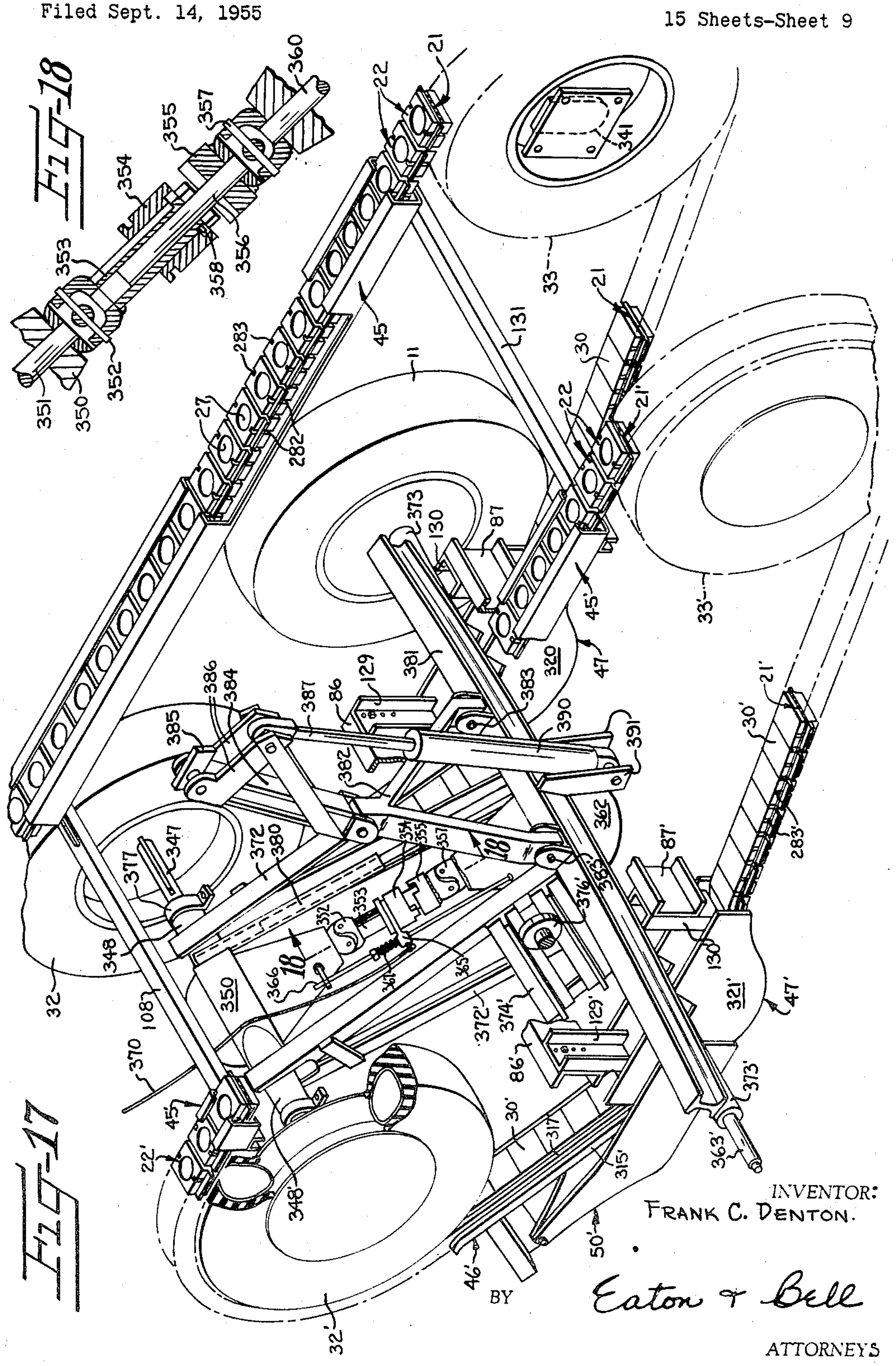
Figure 20:
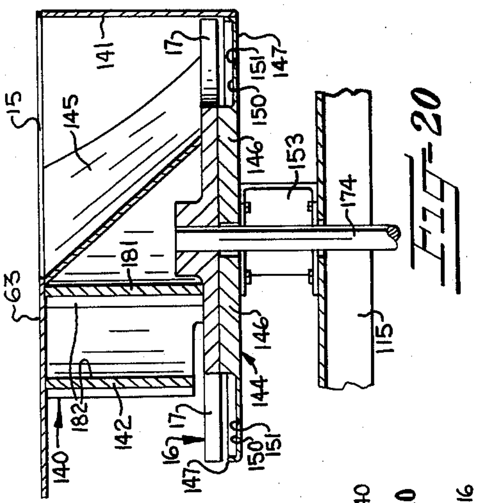
Figure 21:
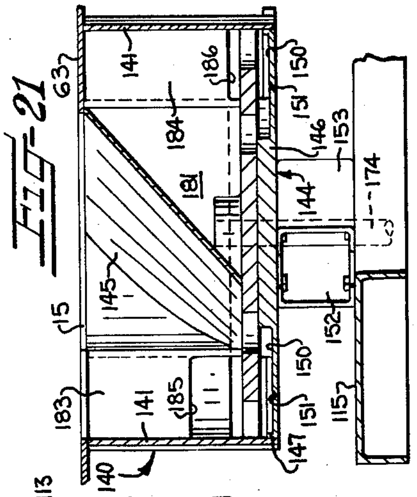
Figure 19:
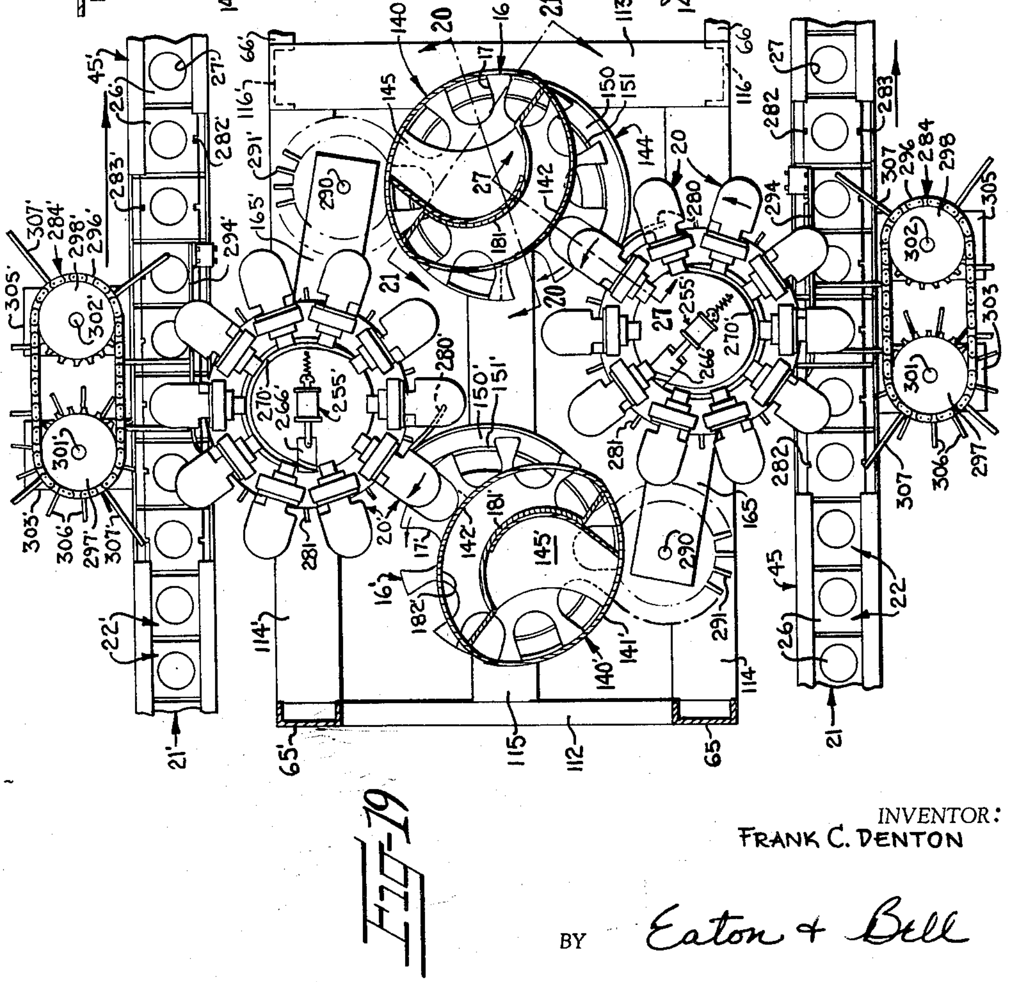
Figure 22:
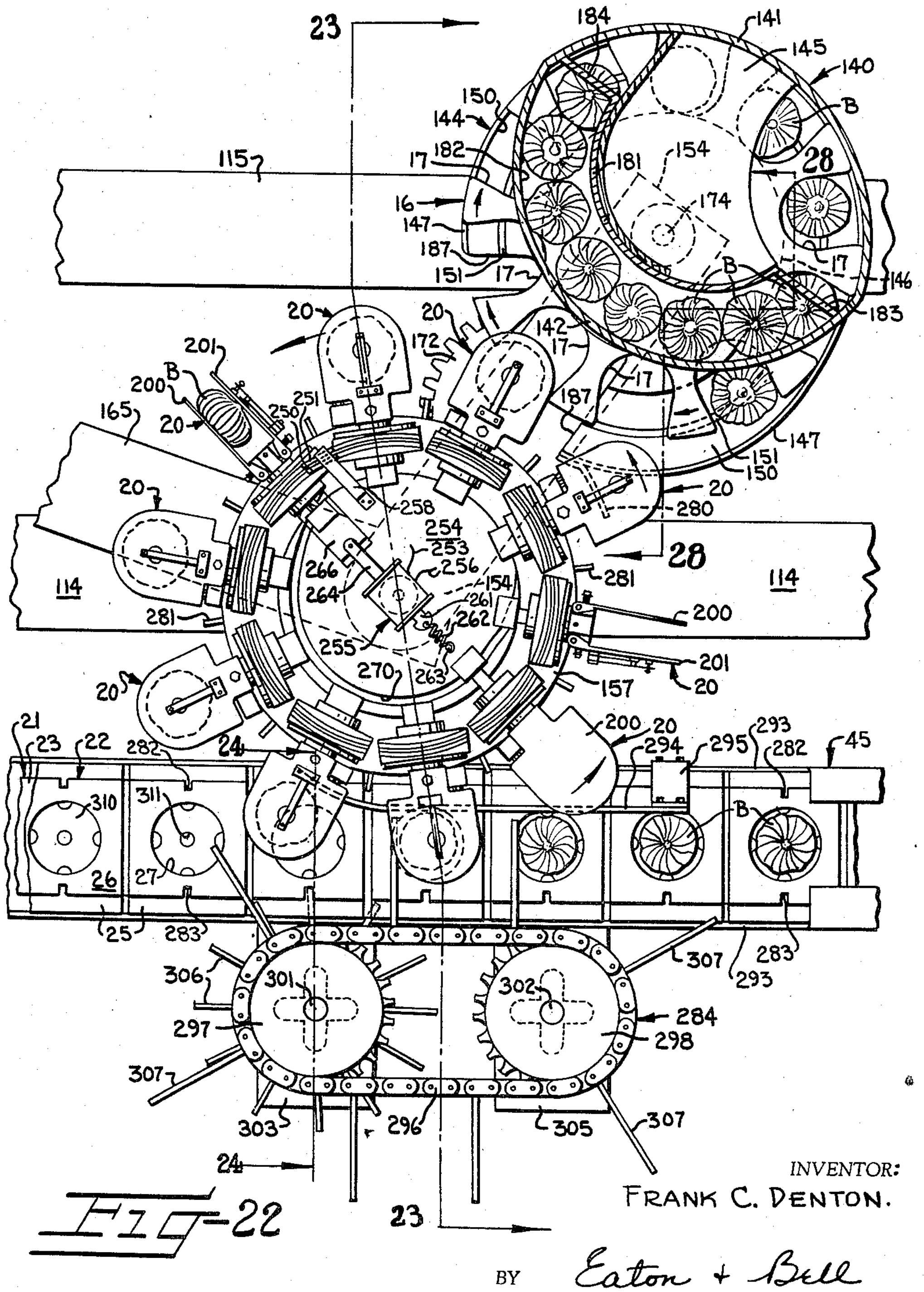
Figures 23, 24:
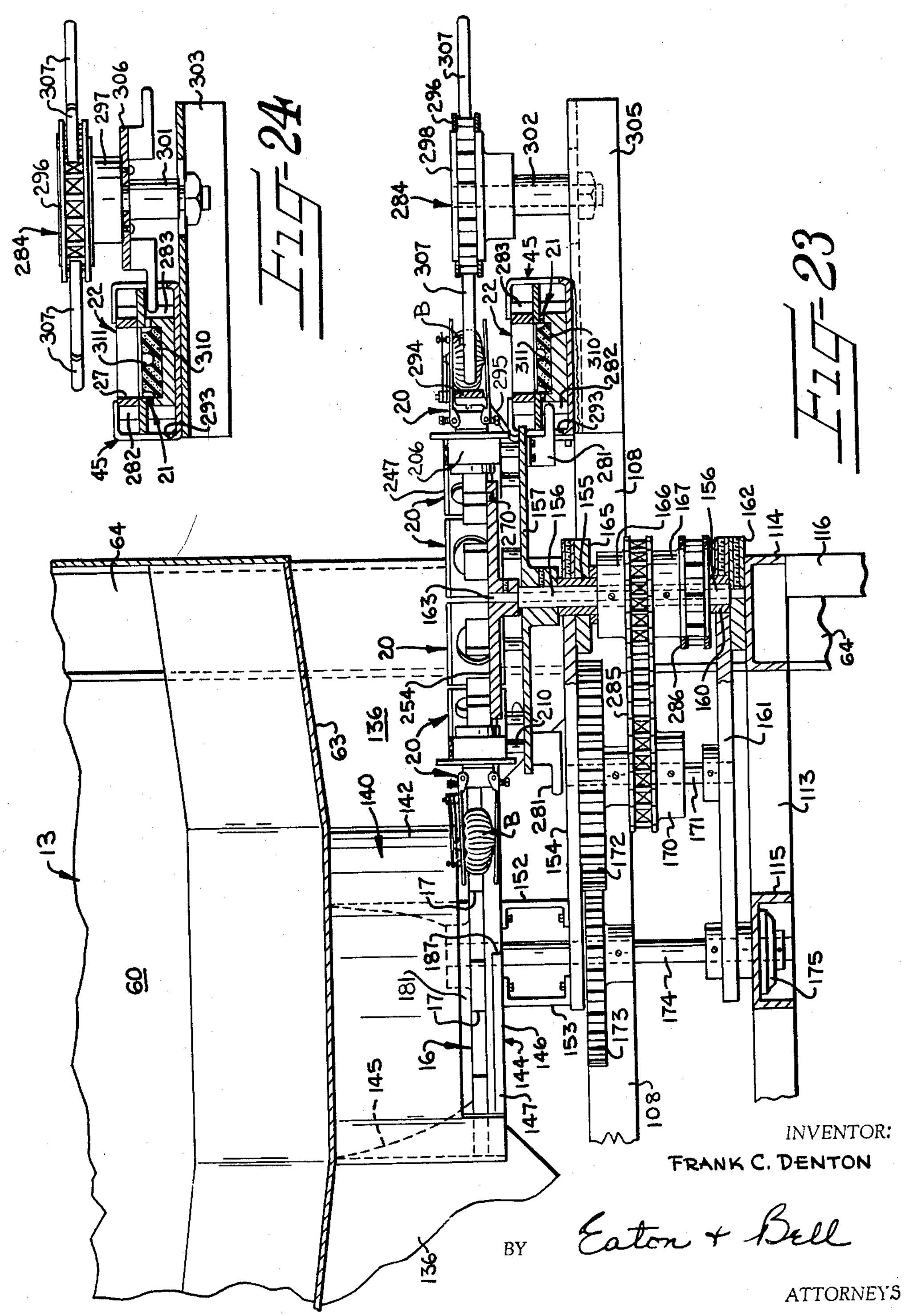
Figure 25:
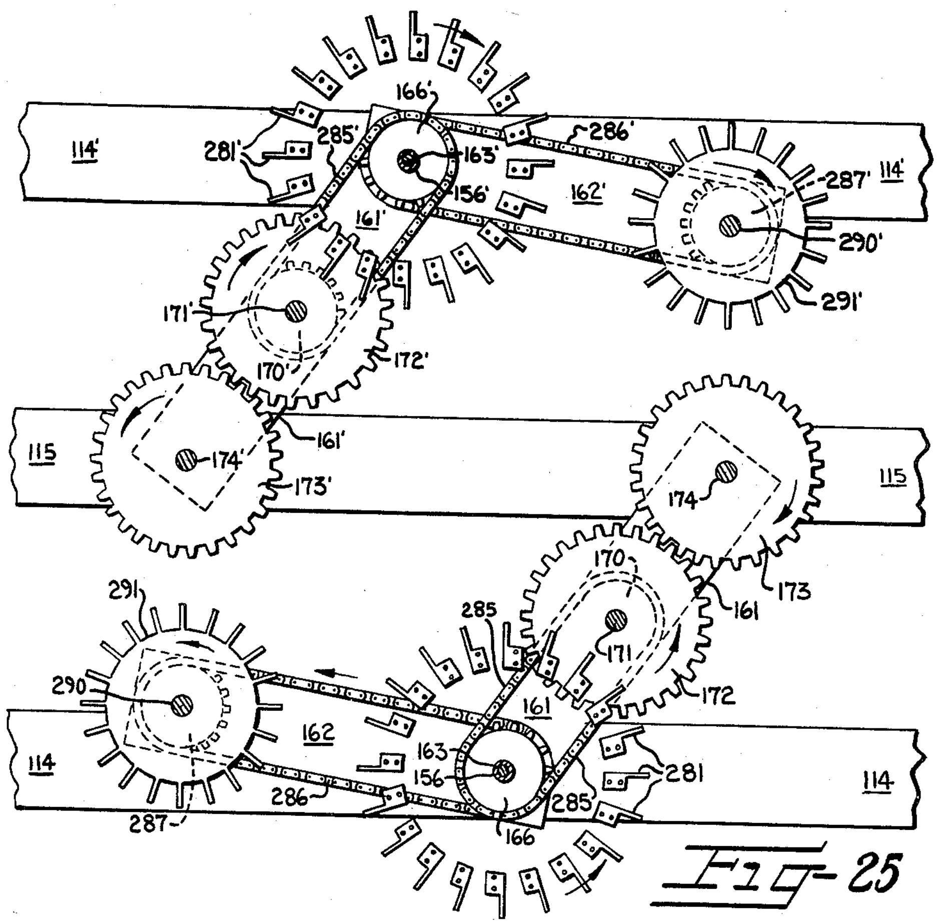
Figure 26:
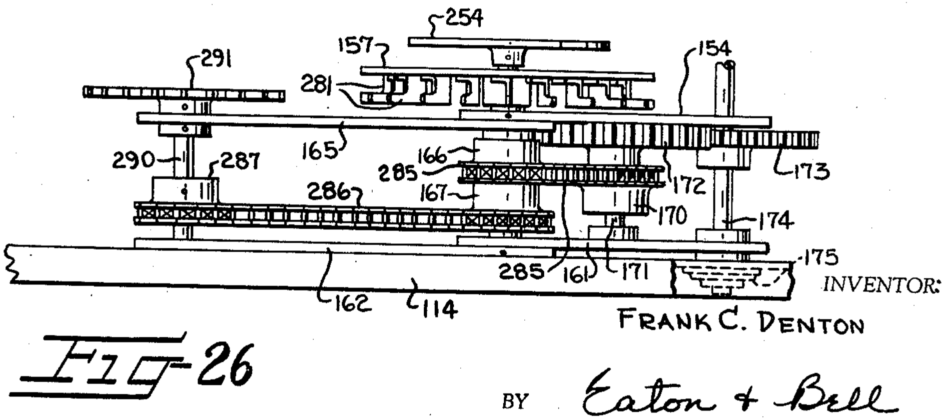
Figure 27:
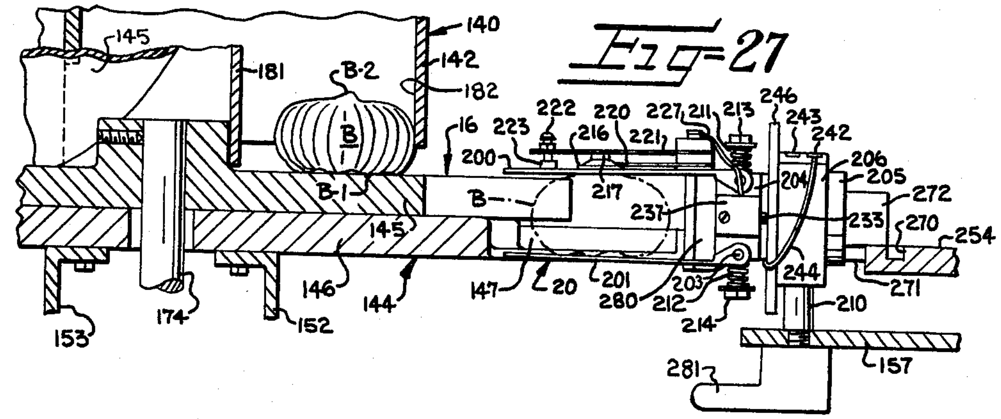
Figure 28:
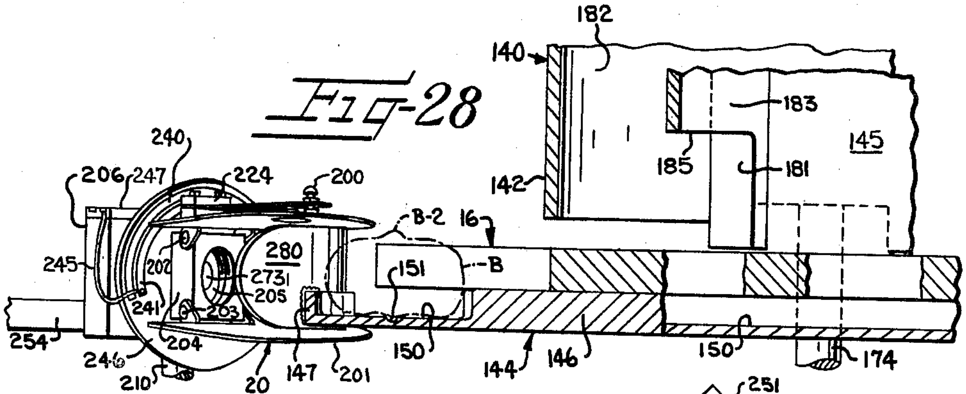
Figure 29:
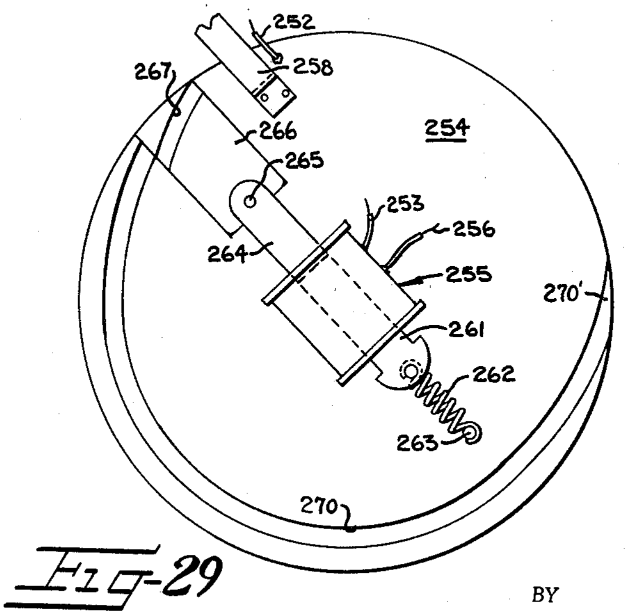
Figure 30:
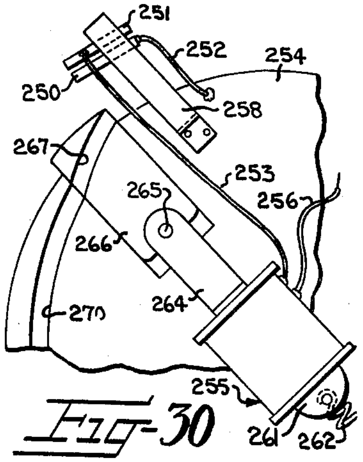
Figures 31, 32, 33, 34, 35:
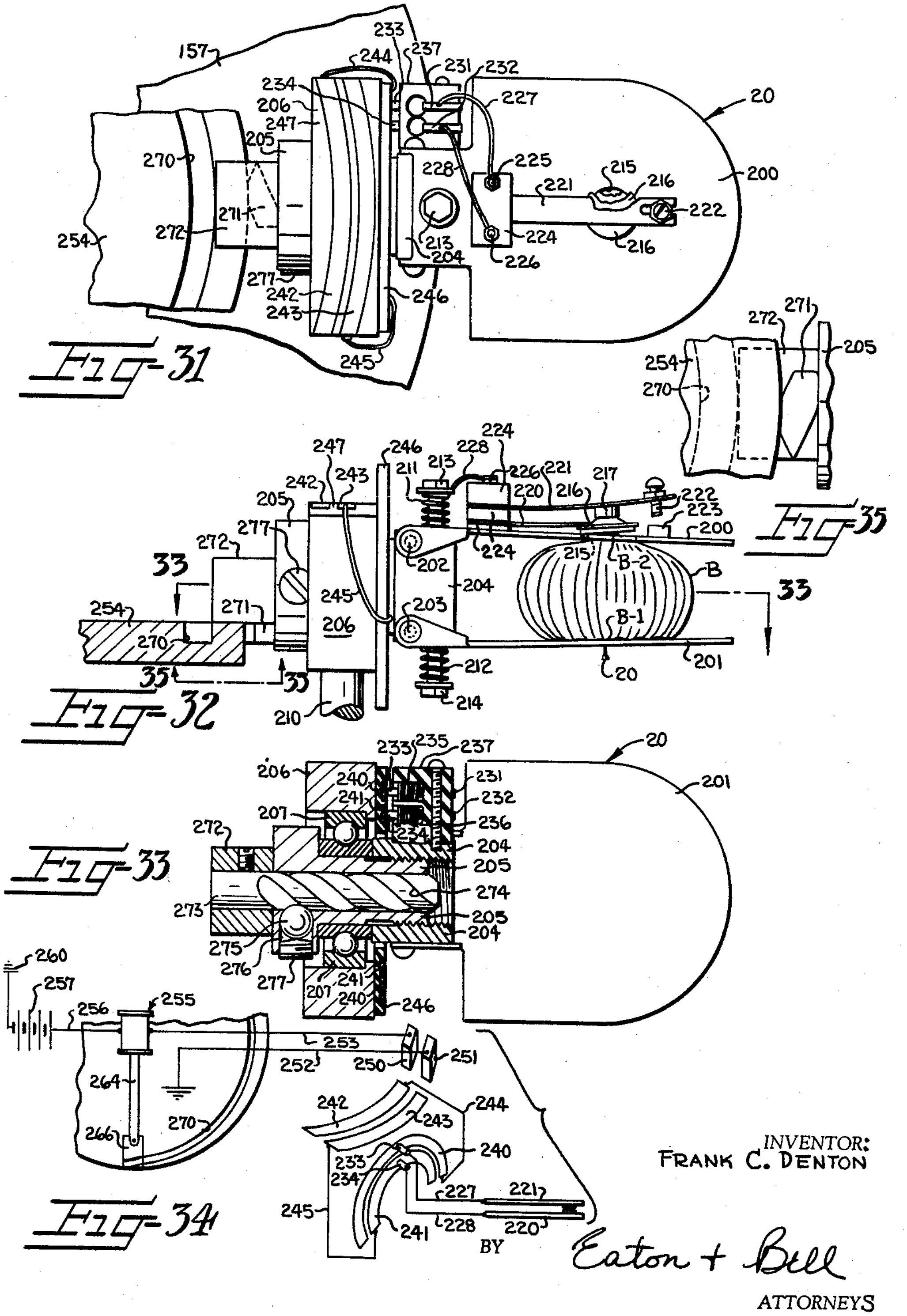

Figure 15–A is an isometric view showing panels and floors as mounted on the frame shown in Figure 15;

Figure 16 is a fragmentary vertical sectional view taken substantially along line 16—16 in Figure 1 and showing the manner in which one of the sleeves of one of the endless conveyors is mounted;

Figure 17 is an enlarged isometric view of the carriage or frame raising or lowering apparatus and showing the driving connection between the ground wheels and the front wheels which support the conveyor belts, with parts broken away for purposes of clarity;

Figure 18 is an enlarged fragmentary view through the clutch mechanism taken substantially along line 18—18 in Figure 17;

Figure 19 is an enlarged fragmentary plan view taken substantially along line 19—19 in Figure 6 showing the means for feeding or transferring bulbs from the hopper to the upper runs of the conveyors;

Figure 20 is a somewhat schematic enlarged fragmentary view taken substantially along line 20—20 in Figure 19 showing the chute for guiding bulbs from the hopper onto a rotary bulb-separating platform;

Figure 21 is another view of the bulb-separating means of one of the bulb feeding devices taken substantially along line 21—21 in Figure 19;

Figure 22 is an enlarged view of the lower right-hand portion of Figure 19 showing the parts more in detail;

Figure 23 is a transverse vertical sectional view through the bulb feeding and turning apparatus taken substantially along line 23—23 in Figure 22;

Figure 24 is an enlarged fragmentary vertical sectional view taken substantially along line 24—24 in Figure 22;

Figure 25 is a somewhat schematic plan view of the driving means for both bulb feeding devices taken substantially along line 25—25 in Figure 6;

Figure 26 is a fragmentary elevation looking substantially at the lower side of Figure 25, and showing the turret platform for supporting the cogs 281;

Figure 27 is an enlarged fragmentary vertical sectional view showing the proximal portions of the bulb-separating means of one of the feeding devices taken substantially along line 27—27 in Figure 19;

Figure 28 is a view similar to Figure 27, but being taken substantially along line 28—28 in Figure 22;

Figures 29 and 30 are somewhat schematic plan views showing parts of the means for controlling the turning or inverting of the botanical bulbs;

Figure 31 is an enlarged top plan view of one of the bulb-transferring and turning devices in normal position;

Figure 32 is a side elevation of one of the bulb transferring or turning devices looking up at the lower side of Figure 31 and showing the same as though it has just received a bulb incorrectly positioned for transfer to the corresponding conveyor;

Figure 33 is a fragmentary vertical sectional plan view substantially along line 33—33 in Figure 32, omitting the bulb;

Figure 34 is a schematic electrical diagram for the circuit for effecting rotation of any of the transferring or turning devices upon a bulb being improperly positioned therein;

Figure 35 is a fragmentary view looking up substantially along line 35—35 in Figure 32 and showing the cam follower instrumental in imparting rotary movement to a corresponding bulb transfer device upon such rotative movement being called for.

*Brief synopsis of the invention*

The improved bulb planter generally comprises a frame broadly designated at 10 which is supported on a pair of retractable ground wheels 11, 11′ and which may be self-propelled, or as shown in this instance, drawn by a suitable tractor 12 (Figure 7) or other means. The upper central portion of the frame 10 supports a hopper broadly designated at 13 for containing a supply of bulbs such as are indicated at B. The bulbs B are of the usual shape of botanical bulbs in that they are substantially elliptical or spherical and each has a substantially flat portion B–1 on the bottom or one side thereof and the opposite side of each bulb has a projection or rounded stem portion B–2 thereon which forms the top of the bulb when it is planted as shown in dotted lines in Figure 11.

The bottom wall of the hopper 13 (Figure 1) has a pair of discharge openings 15, 15′ therein through which bulbs may fall from the hopper 13 onto a pair of rotary article or bulb-separating and transferring base platforms, discs or star wheels broadly designated at 16 and 16′, respectively. The star wheels 16, 16′ form the first stages of respective bulb feeding and transfer units and are provided with circularly spaced recesses or notches 17, 17′ in which the bulbs B are successively positioned by means to be later described. During the course of rotation of the star wheels 16, 16′ the bulbs B are successively transferred, one at a time, to respective circular series of article or bulb transferring and inverting or turning devices or article grasping devices broadly designated at 20, 20′. The article transferring and turning devices 20, 20′ are driven to rotate substantially about vertical axes in timed relation to the star wheels 16, 16′.

In the event of a bulb being received by any one of the article transferring and turning devices 20, 20′ with its stem B–2 facing upwardly, means are provided to automatically cause the corresponding article transferring and turning device to rotate a half revolution in one direction about a substantially horizontal axis and then back to its original position during the course of each complete revolution of a turret which carries each circular series of article transferring or turning device. The corresponding article transferring and turning devices 20, 20′ register with corresponding pockets in endless conveyors 21, 21′ respectively which have a movement similar to the tracks on a bulldozer wherein the tracks in contact with the earth remain stationary while the body of the bulldozer passes thereover and thereafter move in a substantial vertical direction.

Of course, if the bulbs B are transferred to corresponding article transferring and turning devices 20, 20′ right-side up, the article transferring and turning devices do not rotate about horizontal axes with rotation of the corresponding series of article transferring and turning devices about a substantially vertical axis, as will be more fully described hereinafter.

Since the parts on both sides of the bulb planter machine are substantially the same, only those parts at the right-hand side of the machine will be described in detail and like parts at the left-hand side of the machine will bear the same reference characters with the prime notation added.

The circular series of article transferring and turning devices 20 comprises the second stage of the article feeding means for feeding articles from the hopper 13 to the conveyor 21. The pocket units of the conveyor 21 are each designated at 22 (Figures 2, 3 and 12) and are attached to an endless conveyor belt 23. Each of the pocket units 22 is of built-up construction and is made from three substantially rectangular blocks including a base block 24, an intermediate key block 25 and an outer block 26. The blocks 24, 25, 26 and corresponding portions of the conveyor 23 are collectively provided with a pocket 27 therein for receiving a bulb B therein. The pocket units 22 will be more fully described hereinafter.

The conveyor 21 is driven in timed relation with the series of article transferring and turning devices 20 so that each successive device 20 containing a bulb B registers with one of the pocket units 22, at which time, an ejector mechanism ejects the corresponding bulb from the article transferring and turning device and, whereupon, the bulb B drops into the pocket 27 of the corresponding pocket unit 22. The conveyor 21 also comprises a flexible endless member preferably made from canvas or the like indicated at 30 and the inner surface of the endless belt 30 of the conveyor 21 is guided on front and rear wheels 32, 33 respectively which are preferably, but not necessarily, provided with pneumatic tires thereon, as shown.

It will be observed in Figures 2, 3 and 6 that as the conveyor 21 passes under a pulley 40 and in engagement with the front wheel 32, the bulbs B are pressed downwardly against cushion members 310 by a pair of spaced endless belts 35 to compress the cushion members and seat the bulbs inside the confines of the pockets 27. The bulbs B are retained in the pockets 27 by the pair of belts 35 throughout subsequent movement of the conveyor 21 while in engagement with the front wheel 32 to transfer the bulbs without damage to an inclined chute 312 (Figure 8) wherein the bulbs are moved down to a bulb transfer or planting station 47 with the cushion members 310 compressed. It will be noted that the belts 35 are mounted on three pulleys 40, 41, 42 which form the belts 35 into three reaches, the rearmost reach which conforms to the configuration of that portion of the conveyor 21 which engages the front wheel 32.

Figures 8, 9:
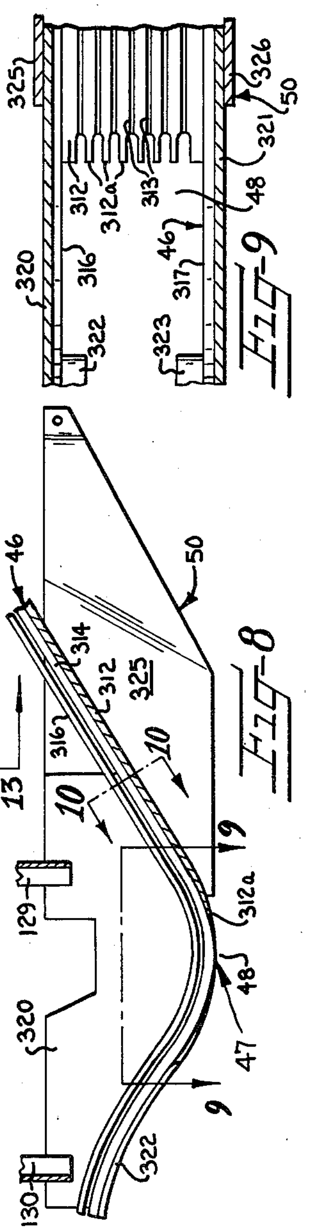
Figure 8 is an enlarged fragmentary vertical sectional view taken substantially along line 8—8 in Figure 4 showing a portion of the track for guiding the corresponding conveyor belts and also showing a portion of the plough in association therewith.
Figure 9 is an enlarged fragmentary sectional view taken substantially along line 9—9 in Figure 8.

The upper reach or run of the conveyor 21 is supported and guided in a track assembly broadly designated at 45 (Figure 6) and it will be noted that a lower track assembly and bulb ejector mechanism or bulb discharge mechanism broadly designated at 46 deflects the lower reach or run of the conveyor 21 out of the normal path between the wheels 32, 33 and retains the bulbs in the pocket units 22 as the conveyor passes out of engagement with the front wheel 32 and confining belts 35 and downwardly at an angle to the bulb planting station or bulb discharge station 47 defined by a relatively large opening 48 in the lowermost portion of the lower track assembly 46 (Figures 8 and 9).

Figures 11, 12:
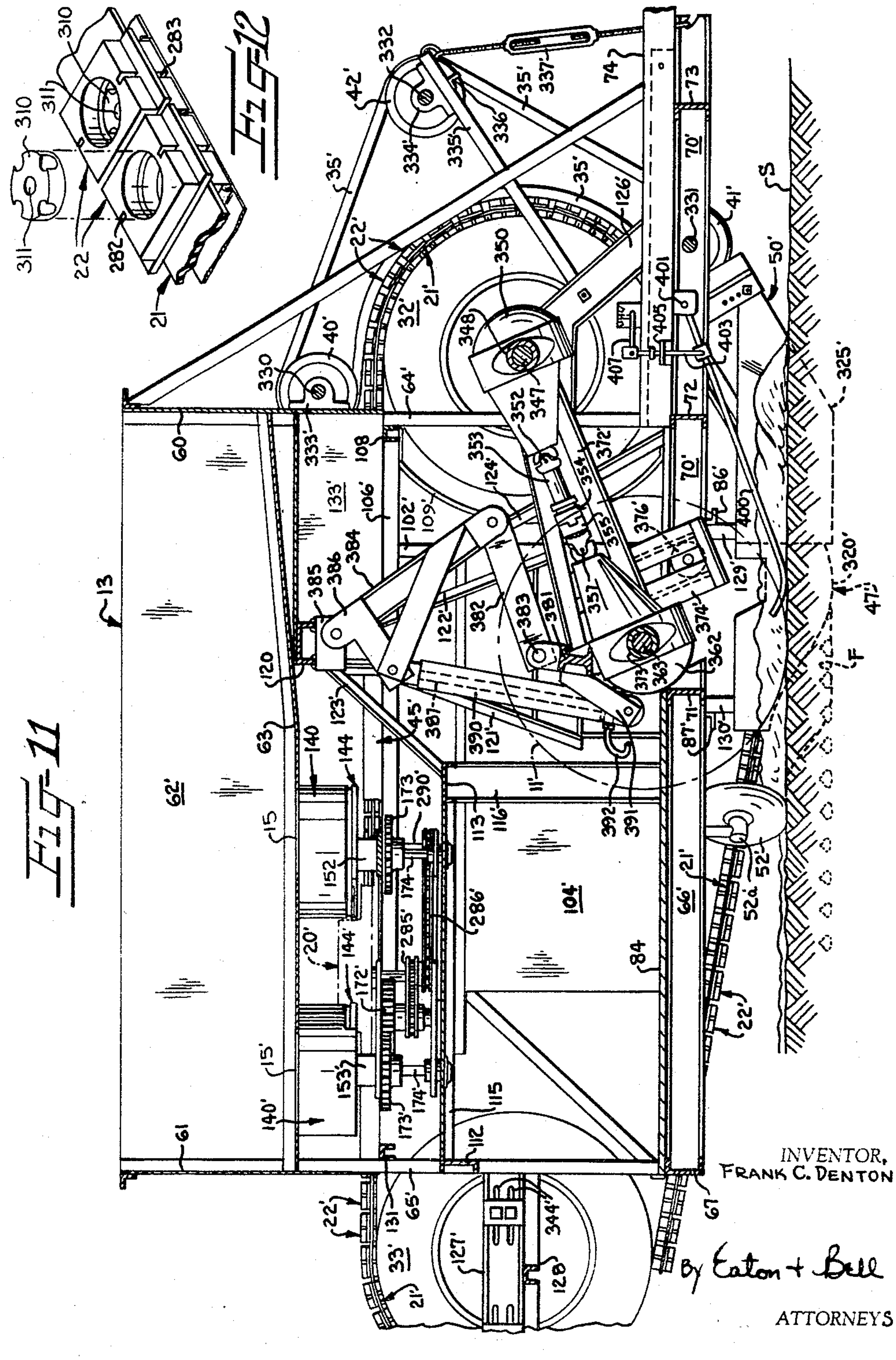
Figure 11 is a longitudinal vertical section through the machine similar to that shown in Figure 7 but on a larger scale and showing the corresponding conveyor and frame in lowered or operative position relative to the ground wheels thereof.
Figure 12 is a fragmentary isometric view, partially exploded, showing two of the bulb receiving pockets of the conveyor and its guide means looking in the general direction of the arrow indicated at 12 in Figure 2.

When the ground wheels 11, 11′ are retracted as best shown in Figure 11, this lowers the frame 10 so the bulb planting station 47 is disposed at a predetermined distance below the level of the lower surfaces of the ground wheels 11, 11′. A suitable plough or furrow opener broadly designated at 50 (Figure 6) is provided immediately forward of the bulb planting station 47 with its lower surface disposed on substantially the same level as the lower surface of the bulb planting station 47 to thereby form a furrow F (Figure 11) in the soil or earth whose upper surface is indicated at S.

It is apparent that as each successive pocket unit 22 registers with the opening 48 at the bulb planting station 47, the corresponding bulb B therein is discharged from the pocket 27 through the opening 48 and deposited upon the bottom of the furrow F by a firm pressure exerted by the cushion member 310. It will be noted that the rear portion of the lower or bottom run of the conveyor 21 is deflected upwardly at a relatively sharp angle as it leaves the bulb planting station 47 to thereby move away from the planted bulbs in a substantially vertical direction to avoid disturbing of the position of the bulbs having their stems facing upwardly. This substantially vertical movement of the conveyor as previously stated is similar to the movement of the tracks on a bulldozer. This sharp upward movement of the conveyor permits the close positioning thereto of a suitable furrow closing or covering means which is in the form of a pair of angularly arranged disks 51, 52 (Figures 4, 5, 6, 7 and 11) which straddle the lower run of the conveyor 21 and whose lower edges are disposed on substantially the same level as the lower surfaces of the ground wheels 11, 11′ and which, due to their relative angular positions, deflect the soil which has been displaced by the plough 50 back into the furrow F thereby covering the bulbs B.

It will be noted that the pair of furrow covering disks 51, 52 are rotatably mounted on suitable brackets 51*a*, 52*a* (Figure 5) which extend upwardly and are preferably adjustably secured to fixed parts of the frame 10 so they may be adjusted toward and away from the center of the planter in accordance with any corresponding adjustments in the conveyor 21.

*Hopper and frame assembly*

The hopper 13 (Figure 1) is in the form of an elongated relatively narrow open topped bin and comprises front and rear walls 60, 61, opposed side walls 62, 62′ and a bottom wall 63. The rear portion of the bottom wall 63 is provided with the discharge openings 15, 15′ therein and the front portion of the bottom wall 63 preferably slopes downwardly toward the openings 15, 15′ as shown in Figures 6 and 11. The bottom wall 63 of the hopper 13 is suitably connected to the front, rear and side walls of the hopper and the proximal corners of adjacent side walls and the front and rear walls of the hopper are suitably secured to pairs of front and rear upright frame members or corner posts 64, 64′ and 65, 65′, respectively. Lower ends of the rear upright frame members 65, 65′ are fixed to the rear ends of a pair of longitudinally extending rear chassis frame members 66, 66′ (Figures 7, 11 and 15) whose rear ends are connected to opposite ends of a rear transverse chassis frame member 67. The lower ends of the front upright frame members or corner posts 64, 64′ are fixed to a pair of spaced, parallel, front longitudinally extending chassis frame members 70, 70′ alined with the rear chassis frame members 66, 66′ and whose rear ends are spaced from the front ends of the rear chassis frame members 66, 66′ to provide an opening therebetween for accommodating the retractable ground wheels 11, 11′, to be later described.

The front ends of the rear chassis frame members 66, 66′ (Figure 15) are connected to opposite ends of a transverse frame member 71 and medial portions of the front chassis frame members 70, 70′ are fixed to opposite ends of a pair of longitudinally spaced transverse frame members 72, 73. Tongue 74 is fixed on the transverse chassis frame members 72, 73 and extends forwardly beyond the front longitudinal chassis frame members 70, 70′ and has a C-shaped clevis 75 (Figure 7) adjustably secured thereto which is adapted to be connected to a draw bar 76 on the rear of the tractor 12. Of course, as heretofore stated, the implement or machine may be provided with its own motive force in lieu of the tractor 12 without departing from the spirit of the invention.

The inner ends of a plurality of longitudinally spaced horizontally disposed frame members 80, 81, 82 and 80′ 81′ and 82′ (Figure 15) are fixed to the respective rear longitudinal chassis frame members 66, 66′ and extend outwardly therefrom and their outer ends are connected to respective common longitudinal main floor supporting frame members 83, 83′. The frame members 66, 66′, 80 through 83 and 80′ through 83′ support a substantially rectangular lower platform or main floor panel 84 (Figures 15 and 15–A). The rear end portions of the two front longitudinally extending chassis frame members 70, 70′ support the inner end portions of respective relatively small substantially rectangular foot boards or panels 85, 85′ which extend outwardly therefrom and are also supported on respective outwardly projecting relatively heavy frame members 86, 86′. Similar relatively short and heavy frame members 87, 87′ assist in supporting the main floor panel 84. The inner ends of the frame members 86, 86′ and 87, 87′ are suitably secured to the respective longitudinally extending chassis frame members 70, 70′ and 66, 66′. The proximal portions of the main floor panel 84 and the respective foot boards or relatively small panels 85, 85′ are bridged by built-up substantially inverted U-shaped axle shields 90, 90′ (Figure 15–A) whose proximal ends are spaced from each other and are suitably secured to built-up substantially inverted U-shaped frames 91, 91′.

Opposite sides of the bulb planter are provided with suitable seats 92, 92′ for attendants of the machine. The seats 92 are supported on respective pairs of longitudinally extending angle bars or frame members 93, 94 and 93′, 94′ (Figure 15) whose front ends are suitably secured to opposite ends of respective relatively short transverse frame members 96, 96′ and whose rear portions are also suitably secured to opposite ends of respective relatively small transverse frame members 95, 95′. The inner seat supporting frame members 94, 94′ are fixed to the upper ends of respective upright frame members 100, 101, 102 and 100′, 101′, 102′. The lower ends of the frame members 100, 101, 100′, 101′ are fixed to the respective transverse frame members 81, 82, 81′, 82' and the lower ends of the upright frame members 102, 102' are suitably secured to the sets of upright frame members 100—102 and 100'—102' support suitable respective panels 104, 104' (Figures 5, 6, 7, 11, 13 and 15–A). The rear portions of the longitudinally extending seat supporting frame members 93, 93' are also suitably secured to medial portions of respective upright frame members 105, 105' whose lower ends are suitably secured to medial portions of the longitudinally extending main floor supporting members 83, 83'.

The upper ends of the frame members 105, 105' (Figures 15 and 15–A) support rear portions of respective hand rails or back rest bars 106, 106' which extend forwardly and are connected to the distal ends of inwardly projecting transverse frame members 107, 107', respectively.

The proximal or inner ends of the frame members 107, 107' are fixed to opposite ends of an intermediate transverse frame member 108 (Figure 15). The intermediate frame member 108 is suitably secured to medial portions of the front upright corner posts 64, 64' of the frame 10.

The wheels 32, 32' are provided with respective shields 109, 109' to protect the occupants sitting on the seats 92, 92'. The shields 109, 109' are secured at their upper ends to the transverse frame member 108 and the lower ends secured to 85, 85', respectively.

It will be best observed in Figures 6, 15 and 15–A that the forward portions of the back rest bars or hand rails 106, 106' are fixed to the upper ends of respective upright frame members 110, 110' whose lower ends are suitably secured to the front ends of the outer seat supporting frame members 93, 93', respectively.

Spaced below the hopper 13 and substantially on the same horizontal plane or level as the seats 92, 92' is a feeding-device-supporting framework comprising rear and front transverse frame members 112, 113 (Figure 15) and three spaced longitudinally extending frame members 114, 115, 114'. The rear transverse frame member 112 is fixed to and spans the distance between the upright corner posts 65, 65' and supports the rear end of the longitudinal frame member 115. The rear ends of the longitudinal frame members 114, 114' are suitably secured to the upright corner posts 65, 65'. The front ends of the three longitudinal frame members 114, 115, 114' are suitably secured to the front transverse frame member 113 whose opposite ends are suitably secured to upright frame members 116, 116'. The lower ends of the frame members 116, 116' are suitably secured to the longitudinally extending chassis frame members 66, 66'.

The frame 10 also includes an A-frame structure (Figures 4, 7, 11, 13 and 15) for supporting the ground wheel retracting and extending mechanism which A-frame comprises an inverted substantially V-shaped frame member 120 whose upper edge is disposed immediately adjacent the lower surface of the bottom 63 of the hopper 13 and whose opposite legs are suitably secured to the upper ends of respective pairs of downwardly diverging frame members 121, 122 and 121', 122' whose lower ends are fixed to the upper corners of the respective inverted substantially U-shaped frames 91, 91'. The inverted V-shaped frame member 120 is also supported by means of a rear pair of downwardly and rearwardly diverging frame members 123, 123' and a front pair of downwardly and forwardly diverging frame members 124, 124'. The lower ends of the frame members 123, 123' are fixed to opposite ends of the transverse frame member 113 and the lower ends of the frame members 124, 124' are fixed to medial portions of the longitudinally extending chassis frame members 70, 70', respectively.

The frame 10 (Figures 1, 4, 5, 7, 11 and 15) also includes front and rear pairs of conveyor wheel supporting frame members 126, 126' and 127, 127'. The front conveyor wheel supporting members 126, 126' are suitably secured to the corner posts 64, 64', respectively, and extend forwardly and then downwardly at an angle and are suitably secured to the respective front longitudinally extending chassis frame members 70, 70'. The rear conveyor wheel supporting frame members 127, 127' are of the cantilever type and their front ends are suitably secured to medial portions of the respective corner posts 65, 65'. Suitable diagonal bracing 128 (Figures 1 and 15) is provided between the frame members 127, 127'.

The frame member 108 in the upper left-hand portion of Figure 15 serves to support a front portion of the upper track assemblies 45, 45' (Figure 13) and a similar transverse frame member or bar 131 (Figure 15) is suitably secured to medial portions of the upright corner posts 65, 65' for supporting the rear portions of the track assemblies, 45, 45'.

Figure 13:
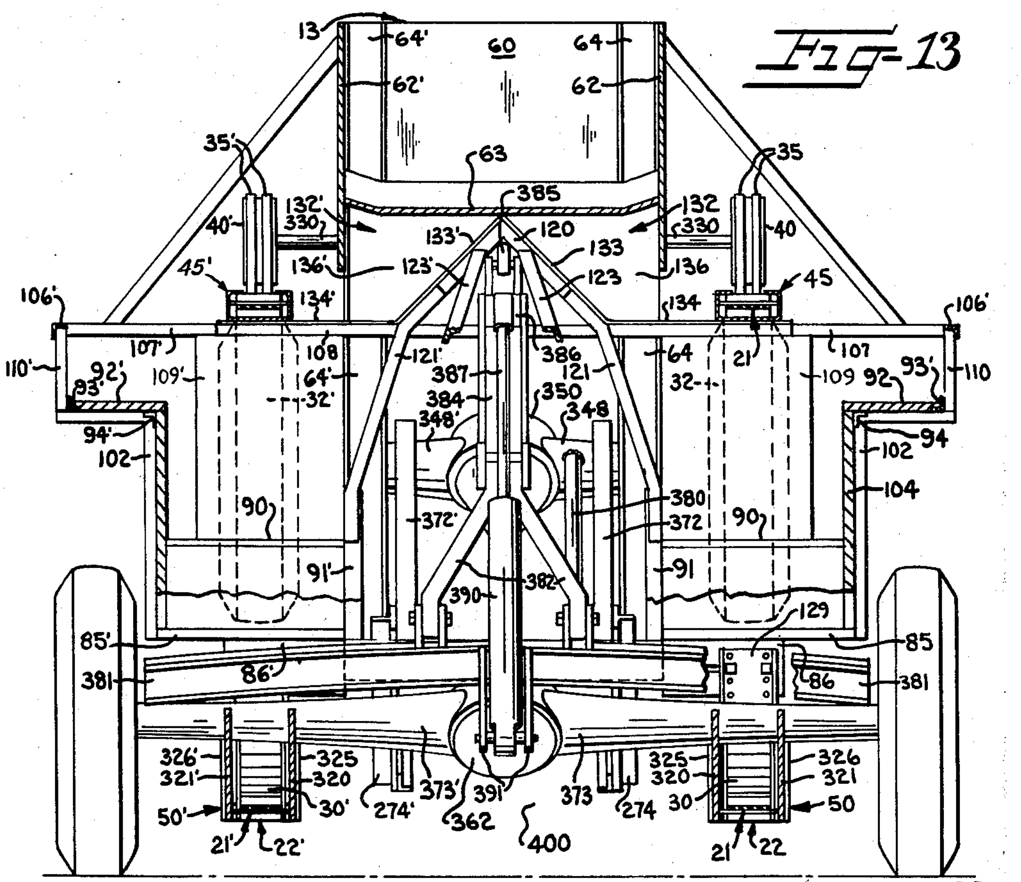
Figure 13 is an enlarged transverse vertical sectional view, mostly in elevation, taken substantially along line 13—13 in Figure 7 and showing, in particular, the means for raising and lowering the carriage or framework of the machine relative to the ground wheels thereof.

As best shown in Figure 13, the side walls 62, 62' of the hopper 13 extend downwardly below the bottom wall 63 and serve as outer walls of auxiliary bins broadly designated at 132, 132', which bins are adapted to contain bulbs which are readily accessible to the operators seated on the seats 92, 92'. Thus, in the event of failure of the automatic feeding mechanism, to be later described, to position bulbs in any of the pocket units 22, 22', the operators may select bulbs from the bins 132, 132' and manually position them in the empty pocket units. The auxiliary bins 132, 132' comprise respective sloping inner walls 133, 133' whose proximal upper edges are interconnected and whose front edge portions are supported on the respective inclined legs of the inverted substantially V-shaped frame member 120. It will be observed in Figure 13 that the lower edges of the sloping inner walls 133, 133' of the bins 132, 132' terminate inwardly of the vertical planes of the side walls 62, 62' and in spaced relation below the level of the lower edges of the side walls 62, 62' of the hopper 13. The lower edges of the sloping inner walls 133, 133' of the bins 132, 132' are connected to the inner ends of respective access platforms 134, 134'. The access platforms 134, 134' extend outwardly and terminate inwardly of the vertical planes of the respective seats 92, 92'. The front edge portions of the access platforms 134, 134' are suitably secured to the conveyor track supporting frame member 108.

It will be observed in Figures 4, 5, 6, 7 and 11 that the front and rear walls 60, 61 of the hopper 13 also extend downwardly substantially below the level of the bottom wall 63 of the hopper 13 and, accordingly, the lower portion of the wall member 60 serves as the front wall of the bins 132, 132'. A pair of rear wall members 136, 136' (Figure 13) is provided for the bins 132, 132', the rear wall members 136, 136' being disposed on substantially the same vertical plane as the rear edge of the inverted V-shaped frame member 120. The access platforms 134, 134' are preferably made from a relatively rigid material so the rear and outer edges thereof need not be supported.

*Bulb feeding and positioning means*

The bulb feeding and positioning means are best illustrated in Figures 6, 7 and 19–34. As heretofore stated, the bulb feeding and positioning devices for the conveyors 21, 21' are substantially the same and comprise respective bulb separating devices or star wheels 16, 16' and respective circular series of bulb or article transferring and turning devices 20 which are driven by the respective conveyors 21, 21'. Accordingly, only the bulb feeding and positioning devices associated with the conveyor 21 will be described in detail and like parts associated with the conveyor 21' will bear the same reference characters with the prime notation added in order to avoid repetitious description.

The upper end of a conduit or bulb feed tube 140 (Figures 6, 19–23, 27 and 28) is fixed to the lower surface of the bottom wall 63 of the hopper 13, the bulb feed conduit 140 being substantially elliptical in plan and being of substantially greater dimensions than the discharge opening 15 in the bottom wall 63 of the hopper 13. The feed conduit 140 comprises a pair of interconnected segmental walls 141, 142 (Figure 22) and the lower edge portion of the segmental wall 141 is of an internal radius slightly greater than the external radius of the star wheel or bulb separating device 16 and is suitably secured to the periphery of an involute curved track broadly designated at 144. The opening 15 in the bottom 63 of the hopper 13 also has an inclined chute 145 (Figures 20 to 23) therein which guides the bulbs from the hopper 13 downwardly toward the lower portion of the segmental wall portion 141 of the feed conduit 140. The involute track 144 is of generally circular form in plan and has a second central portion 146 (Figures 20 and 21) and a peripheral rib 147 formed as the outer wall of a groove 150 which serves as said involute track 144.

The groove 150 of the track 144 is necessarily of slightly greater width than the normal diameter of a bulb so that each successive bulb may slide loosely therein as shown in Figure 22 by means to be presently described. It will be noted that the bottom wall of the groove 150 also has a relatively small relief or groove 151 (Figures 20 and 28) in the central portion thereof to accommodate the stem portion B–2 of successive bulbs B. The involute track assembly 144 is fixed on the upper end of a pair of brackets 152, 153 (Figure 23) which are shown in the form of relatively short channel bars, and whose lower ends are fixed to one end of a horizontally disposed plate or swing arm 154 which extends outwardly toward the conveyor and is fixed to a bushing or bearing 155 (Figure 23) loosely mounted on a vertically disposed tubular shaft 156. The tubular shaft 156 supports a turret platform or disk 157 which is fixed to the shaft 156 and the lower end of shaft 156 is journaled in a bearing 160 fixed in a bottom swing arm or plate 161. The bushing 160 and the corresponding end of the swing arm 161 rest upon the outer end of a corresponding auxiliary lower swing arm 162 in which the lower end of a turret cam wheel supporting shaft 163 is suitably secured. The auxiliary lower swing arm 162, in turn, rests upon and is supported by the frame member 114. An upper auxiliary swing arm 165 is also pivotally mounted on the bushing 155 and the lower end of the bushing 155 rests upon the upper end of a sprocket wheel 166 which, in turn, rests upon a sprocket wheel 167. The lower end of sprocket wheel 167 rests upon the upper end of the bushing 160.

The turret cam supporting shaft 163 remains stationary and the tubular shaft 156 is driven in a manner to be later described and, in so doing, the sprocket wheel 166 drives a sprocket wheel 170 which is fixed on a vertically disposed jack shaft 171 whose upper and lower ends are journaled in a medial portion of the primary upper and lower swing arms 154, 161 (Figures 23 and 26). The upper portion of the jack shaft 171 has a gear 172 fixed thereon which meshes with a gear 173 fixed on a medial portion of a bulb separator drive shaft 174 which is journalled in or loosely penetrates the central portion of the involute track assembly 144, the inner ends of the primary swing arms 154, 161 and the frame member 115. The shaft 174 is journaled in a bearing 175 fixed to the lower surface of the frame member 115. Resting upon and rotatable upon the central portion 146 and a substantial portion of the rib 147 of the involute track assembly 144 is the separator disk or star wheel 16 (Figures 22 and 23) which is fixed on the upper end of the shaft 174 in concentric relation to the outer lower portion 141 of the feed conduit 140.

It will be noted in Figure 20 that the lower edge of the inclined chute 145 is curved so that it terminates short of or inwardly of the path of travel of the inner ends or bottoms of the notches 17 formed in the periphery of the star wheels 16.

It will be observed in Figure 20 that a segmental wall member 181 is spaced inwardly from the segmental wall portion 142 of the feed conduit 140 to form a curved bulb storage passageway therebetween indicated at 182, the purpose of which will be explained later. Opposite ends of the curved passageway 182 are closed by vertically disposed plates 183, 184 (Figure 22) which may be termed as gates and have openings 185, 186, respectively. It will be observed in Figures 20, 21, 27 and 28 that the lower ends of the walls 181, 142 forming the passageway 182 are spaced a relatively slight distance above the star wheel 16 and the lower edge of the gates 183, 184 are spaced a substantially greater distance above the star wheel 16 than the lower edges of the walls 181, 142 to form the openings 185, 186 respectively so that as the separator disk or star wheel 16 rotates in a clockwise direction in Figures 19 and 22, the bulbs initially fall through the opening 15 and are guided by the chute 145 so they either rest upon the portion of the star wheel 16 moving between the lower edge of the chute 145 and the adjacent portion of the outer segmental wall 141 of the feed conduit 140 or they fall into successive notches 17 in the periphery of the star wheel 16. Of course, as each successive notch 17 is filled and the corresponding bulb falls onto the bottom of the groove 150 forming the involute track, those bulbs thereabove in the chute 145 resting on the star wheel 16 cannot pass into the notches 17. However, the lowermost bulbs which may be resting upon the plate or star wheel 16 tend to move with the star wheel 16 in frictional engagement therewith and are guided through the opening 185 defined between the lower edge of the wall 183 and the upper surface of the plate or star wheel 16 (Figure 21) and are thus guided into the passageway 182 until such time as the passageway 182 may be filled with bulbs B. Of course, the bulbs are limited as to movement in the passageway 182 by engagement with the gate 184.

Of course, since the groove 150 continues outwardly beyond the wall 142 as shown in Figure 22, it is apparent that any bulbs positioned in notches 17 will pass beneath the wall 142 and gate 183. The bottom edge of the wall or gate 184 also terminates on substantially the same level as the lower edge of the segmental wall 142 of the feed conduit, so that as each successive notch 17 in the disk or star wheel 16 registers with the corresponding end portion of the passageway 182, any bulb B thereabove in the passageway 182 will drop into the corresponding notch 17 and will thus be propelled around in a clockwise direction along the track 150. It will thus be observed that passageway 182, when filled with bulbs as shown in Figure 22, will permit the loading of the bulbs B adjacent the gate 184 into the notches 17 of the star wheel 16 and no bulbs will be loaded at the bottom of the chute 145 since all of the notches 17 passing thereunder will have a bulb already positioned therein.

It will be noted in Figure 22 that the discharge end of the groove or track 150 flares outwardly relative to the periphery of the circular disk or star wheel 16 and the involute track assembly 140 is cut away to form a relatively large slot or notch 187 in the periphery thereof adjacent the circular series of bulb transferring and inverting devices 20.

It will be observed in Figures 27, 28, 31, 32 and 33 that each of the bulb transferring carriers 20 comprises a pair of spaced opposed jaws or plates 200, 201 whose inner ends are pivotally connected, as at 202, 203 to opposite sides of a jaw-supporting block 204. Each jaw-supporting block is fixed on the outer end of a relatively short tubular shaft 205 (Figure 33) as by being threaded thereunto and each shaft 205 is journaled in a bearing block or housing 206, as by an anti-friction bearing 207. As best shown in the right-hand portion of Figure 27 and in Figure 28, each of the housings 206 is in the form of a substantially rectangular or square block and has a downwardly projecting post 210 thereon which is fixed in the turret plate 157, the blocks 206 being uniformly spaced in circular relationship.

The jaws or plates 200, 201 of each transferring and inverting device 20 are normally urged toward each other by means of respective compression springs 211, 212 (Figure 27) which encircle respective studs or headed screws 213, 214. The screws 213, 214 loosely penetrate the respective blades or jaws 200, 201 and are fixed in opposite sides of the block 204. Movement of the jaw plates 200, 201 toward each other is limited by engagement of these plates with opposite sides of the block 204.

The second jaw 201; that, the lower jaw in Figure 32, is preferably smooth and imperforate. However, the first or upper jaw 200 is provided with a relatively small aperture or opening 215 (Figures 31 and 32) therein into which enters the stem portion or projection B–2 of any bulbs B which are improperly positioned or upside down between jaws 200, 201. The stem B–2 of the bulbs projects upwardly through the aperture 215 only when the bulbs are facing in the wrong direction.

When the bulbs B are improperly positioned, the projection or stem portion B–2 of the corresponding bulb B engages a downwardly biased electrical contact element 216 as shown in Figure 32 and urges the same upwardly into contact with an upper downwardly biased electrical contact 217 which is normally spaced above the lower or first contact element 216. The lower and upper contact elements 216, 217 are carried by electrically conductive leaf spring members 220, 221 and the free or outer end of the upper leaf spring member is provided with an adjustment screw or adjustable abutment 222 thereon for limiting downward movement of the corresponding contact element 217 by engaging a projection or abutment 223 on the normally upper surface of the jaw 200.

The inner ends of the leaf spring members 220, 221 are insulatably secured to the inner portion of the normally upward or first jaw 200 (Figure 32) as by insulation blocks 224. The insulation blocks 224 may be adhesively or otherwise interconnected and secured to the outer or upper surface of the first jaw 200. The insulation blocks have terminals 225, 226 (Figure 31) imbedded therein which are connected to the respective leaf spring contact members 220, 221.

Wires or electrical conductors 227, 228 (Figure 31) lead from the respective terminals 225, 226 to respective contact strips 231, 232 leading to respective brushes or brush contacts 233, 234 (Figure 33). Springs 235, 236 (Figure 33), positioned in suitable cavities formed in an insulation block 237, serve to establish contact between the contact strips 231 and the brushes 233 and also urge the brushes 233 into engagement with respective arcuate electrodes 240, 241 (Figures 28, 31, 33 and and 34). The insulation block 237 is suitably secured to one side of the jaw-supporting block 204 heretofore described. The arcuate electrodes or contacts 240, 241 are each connected to a corresponding second pair of arcuate contacts 242, 243 (Figures 31 and 32) by means of respective conductors 244, 245. It will be observed in Figures 32 and 33 that the first and second pairs of arcuate electrodes 240, 241 and 242, 243 are embedded in respective insulation blocks or plates 246, 247 which are, in turn, suitably secured to the radially outward and upper surfaces, respectively, of the bearing block or housing 206.

In the course of movement of each successive bulb transferring and turning device 20 in a counterclockwise direction in Figure 22 from a position adjacent the bulb separating device 16, the arcuate contacts 242, 243, which are formed concentric with the axis of the turret plate 157, engage respective stationary contacts or brushes 250, 251 suitably insulated from each other and suitably insulated from and carried by a bracket 258 secured to a stationary turret cam wheel 254. The brushes 250, 251 are of sufficient length to span the distance between the pairs of arcuate electrodes 242, 243 of two adjacent bulb transferring and turning devices 20 as shown in Figure 22 and which have corresponding ends of respective conductors 252, 253 connected thereto (Figures 30 and 34). The other end of the wire 252 is grounded to a suitable part of the machine such as the turret cam wheel 254. It will be observed in Figure 23 that the turret cam wheel 254 is fixed on the upper end of the stationary shaft 163 about which the tubular shaft 156 is rotated by means to be presently described.

The end of the wire or conductor 253 remote from the brush 251 is connected to one end of the coil of a solenoid broadly designated at 255, the other end of said coil having a conductor 256 leading therefrom to a suitable source of current such as a storage battery 257 (Figure 34). The storage battery 257 is suitably grounded as at 260.

The coil of solenoid 255 (Figures 22, 29 and 30) surrounds a solenoid plunger 261, which is normally urged outwardly relative to the coil of solenoid 255 by a spring 262 anchored to the stationary turret cam wheel 254, as at 263.

The plunger 261 of solenoid 255 has an extension 264 thereon which is made from insulation material and is connected as at 265 to a switch cam 266 mounted for radial sliding movement in the stationary turret cam wheel 254. The switch cam 266 has an arcuate groove 267 therein which is so curved that, when the coil of solenoid 255 is energized due to the stem B–2 of a bulb B projecting upwardly as shown in Figure 32, the inner wall of the groove 267 is disposed substantially flush with the outer peripheral surface of the stationary turret cam wheel 254 as shown in Figure 30. At this time, the other end of the arcuate groove 267 in the switch cam 266 coincides with one end of an arcuate track or groove 270 formed in the upper surface of the stationary turret cam wheel 254. It will be observed in Figure 29 that the groove 270 in turret cam wheel 254 extends through an arc conforming substantially to the periphery of the cam wheel 254 with the exception of the terminal ends of the groove 270 which flare outwardly and are open at their outer ends, communicating with the periphery of the cam wheel 254.

Now, referring to Figures 31, 32 and 35, it will be observed that an irregularly shaped cam follower 271 is fixed to or integral with a substantially rectangular collar or guide block 272 fixed on the inner end of a jaw turning element or shaft 273. The jaw turning shaft 273 (Figure 33) is loosely mounted in and extends axially of the tubular shaft 205 and is spirally grooved, as at 274. The groove 274 is engaged by a follower shown in the form of a ball 275 (Figure 33) positioned in a cavity 276 formed in the enlarged inner end of the bushing or tubular shaft 205. A screw 277 retains the ball 275 in the cavity 276. It will be observed in Figure 32 that the guide block 272 is prevented from rotating due to engagement thereof with the upper surface of the stationary turret cam wheel 254.

Now, if it so happens that a bulb B received by an article transferring and turning device 20 is properly positioned with its stem B–2 against the second jaw 201 thereof instead of the jaw 200 as shown in Figure 32, the cam follower 271 will merely remain in engagement with the periphery of the stationary cam wheel 254 and the mating periphery of the outer end of the switch cam 266 (Figure 29) throughout a revolution thereof, because of the fact that the contacts 216, 217 (Figure 32) remains in spaced relationship. On the other hand, upon a bulb B being positioned as shown in Figure 32 with its stem B–2 facing upwardly through the corresponding opening 215, it is apparent that the contacts 216, 217 are engaged and with subsequent movement of the article transferring and turning device 20 past the stationary brushes 250, 251 (Figure 22), the solenoid 255 is energized to move the switch cam 266 from the position shown in Figure 29 to the position shown in Figure 30.

It is apparent that the follower 271 will then be directed into the groove 270 by the groove 267 in the switch cam 266 and, in so doing, the switch cam 266 moves the threaded or spirally grooved shaft 273 inwardly (Figure 22) or from right to left in Figures 31, 32 and 33 relative to the tubular shaft 205. Since the lower surface of the guide block or collar 272 rides against the upper surface of the turret cam plate 254, it is prevented from rotating and, accordingly, inward movement of the spirally grooved shaft 273 relative to the tubular shaft 205 imparts rotation to the jaws 200, 201 of the bulb grasping and turning device 20. The arrangement of the spiral grooves 274 in the shaft 273 (Figure 33) and the distance from the cam groove 270 to the outer periphery of the turret cam 254, is such that substantially one-half a revolution will be imparted to the jaw supporting block 204 and the jaws 200, 201 as the corresponding cam 271 is directed into the groove 270 in the cam wheel 254.

Thus, as the corresponding bulb B is moved from between the jaws 200, 201 and deposited in a corresponding pocket unit 22 in the conveyor 21, the stem of the corresponding bulb will be facing downwardly in the upper reach or run of the conveyor 21. With further rotation of any of the sets of jaws 200, 201 which may have been turned in the manner described, it is apparent that the flare-out at the trailing end of the groove 270 will again return the corresponding set of jaws 200, 201 to its original position with the first jaw 200 facing upwardly, preparatory to receiving another bulb B therebetween.

Referring to Figures 22 and 28, it will be observed that the discharge end of the involute track 150 of the assembly 144 has a jaw separating or opening cam 280 thereon. It will be noted that the cam 280 is in the form of an arcuate plate which is rounded at its operating end (Figure 28) and of sufficient height such as to readily force the blade or jaws 200, 201 apart from each other as they pass above and below, respectively, the involute track assembly 144 and the star wheel 16. Thus, as each successive pair of jaws 200, 201 moves into alinement with one of the notches 17 in the star wheel 16, it does not initially engage the upper and lower surfaces of the corresponding bulbs B. However, as the jaws 200, 201 move past the discharge end of the track groove 150 and into the cut away portion 187, they move out of engagement with the jaw opening cam 280 and the springs 211, 212 then urge the corresponding jaws 200, 201 toward each other and into clamping engagement with the upper and lower surfaces of the corresponding bulb B.

*Drive for article feeding devices and details of conveyors*

As heretofore stated, the conveyors 21, 21' are driven through engagement of the ground wheels 11, 11' with the ground and in order to insure that the article turning and transferring turret 157 and the star wheel or bulb separator disk 16 are driven in proper timed relation to movement of the conveyor, it will be observed in Figures 2 and 22 that the pocket units 22 of the conveyor 21, which conveyor is identical to the conveyor 21' are spaced slightly apart from each other on the corresponding endless belt 23. Thus, the leading edge of the block 26 of each successive pocket unit 22 engages one of a circular series of outwardly projecting cogs 281 (Figure 22) which cogs extend inwardly and then upwardly (Figure 23) and are suitably secured, in circularly spaced relationship, to the lower surface of the turret plate 157 for driving the same from the conveyor 21. Since each of the article grasping and turning or inverting devices 20 is secured to the turret plate 157, movement of the turret plate 157 also causes each of the transfer and inverting devices to be revolved.

It should be noted that alternate cogs 281 which are positioned between successive turning devices 20, on the turret plate 157 are engaged by the leading surfaces of successive pocket units 22 and the inner surfaces of the blocks forming each pocket unit 22 are formed with centrally located vertically extending notches 282 therein which notches engage intervening cogs 281, which are positioned below each turning device 20, during the course of forward movement of the upper run of the conveyor 21 (Figures 12, 22, 23 and 24). It will also be noted that the outer surfaces of the blocks forming each pocket unit 22 are each formed with a notch 283 therein which cooperates with the leading surfaces of successive pocket units 22 for driving a bulb-doffing mechanism broadly designated at 284 (Figure 22) which will be later described in detail.

Referring to Figures 19, 23, 24, 25 and 26, it will be observed that since the turret plate 157 is fixed on the upper portion of the tubular shaft 156, the conveyor 21 not only imparts rotation to the turret plate 157 and the circular grasping and turning devices 20 secured thereto but it also imparts rotation to the tubular shaft 156 and, thus, the sprocket wheels 166, 167 are also driven by the conveyor 21. The sprocket wheels 166, 167 have respective sprocket chains 285, 286 mounted thereon which are also mounted on the sprocket wheel 170 and a sprocket wheel 287, respectively. It is apparent that the sprocket chain 285 imparts rotation to the sprocket wheel 170, shaft 171 and gear 172 which, in turn, meshes with gear 173 fixed on shaft 174 to drive the star wheel 16.

The sprocket wheel 287 (Figures 24 and 25) is fixed on a vertically disposed shaft 290 whose lower and upper portions are journaled in the plates or swing arms 162, 165 and on the upper end of which a cog wheel 291 is fixedly mounted.

The cog wheel 291 is provided for the purpose of imparting rotation to the turret plate 157 and the series of article grasping and turning devices 20 as well as the star wheel 16 in the event of the planting machine being set up for planting relatively small bulbs. Of course, in this instance, the conveyors 21, 21' would be substituted by similar conveyors having pocket units, such as pocket units 22, which are of relatively smaller size than those illustrated and are more closely spaced to accommodate the spacing between adjacent cogs on the cog wheel 291 and to ultimately plant the smaller bulbs in closer spaced relationship than the bulbs would be planted with the particular conveyors 21, 21' as shown. Obvious changes would also be required in the doffing mechanism 284 to be later described. If the cog wheel 291 is used for driving the feeding mechanisms, the swing arms 162, 165 are swung outwardly at their free ends and their ends below the turret plate 157 would be moved inwardly so as to move the cogs 281 away from the corresponding conveyor and to move the cogs on the cog wheel 291 in engagement with the conveyor substituted for the conveyor 21.

In order to maintain alinement of the pocket units 22, 22' and to prevent sagging of the runs of the conveyors 21, 21', a substantially channel-shaped track assembly is provided for the upper run of each of the conveyors 21, 21', the track assemblies being respectively designated at 45, 45'. Since both upper run track assemblies 45, 45' are identical, only track assembly 45 will be described in detail and like parts associated with track 45' will bear like reference characters with the prime notation added.

The channel-shaped track assembly 45 is best shown in Figures 2, 3, 6, 22, 23 and 24 wherein it will be observed that it extends over the access platform 134 and opposite ends thereof are suitably secured to corresponding ends of the transverse frame members 108, 131 (Figures 6 and 15). The plate 25 (Figures 2 and 3) which forms a part of each pocket unit 22 extends outwardly beyond the blocks 24, 26 and the endless belt 23 and, while these plates 25 form the upper reach or run of the conveyor 21, they pass between guide members or an upper run track 292 extending longitudinally of and being suitably secured to the inner surfaces of the opposed side walls of the channel-shaped track assembly 45. It will be observed in Figures 1, 6, 11, 22, 23 and 24 that medial portions of opposite side walls of the upper run track 292 are cut away to form an opening 293 in the track 45 through which the cogs 281 and cogs 306 pass as they engage the conveyor 21 (Figure 22).

Now, as the bulb grasping and turning devices 20 move into the vertical plane of the upper run of the conveyor 21, the jaws or plates 200, 201 thereon move astraddle a doffing bar 294 (Figures 19, 22 and 23) spaced above the upper run of the conveyor 21 and extending substantially parallel with the innermost wall portions of the row of pockets 27 in the pocket units 22 so that, in the course of movement of each successive article grasping and inverting device 20 above the conveyor 21, the bulbs are forced out of the corresponding bulb grasping and turning devices 20 from between the jaws 200, 201. The front end of the doffing bar 294 (Figures 22 and 23) is fixed to a bracket 295 which extends downwardly and is suitably secured to the lower portion of the inner wall of the channel-shaped track 45.

Since the bulbs B are forced outwardly from between the jaws 200, 201 of successive article grasping and turning devices 20 by frictional engagement with the doffing bar 294, the bulb doffing mechanism 284 is provided to insure that the bulbs are maintained in vertical alinement with the corresponding pocket units 22. To this end, the bulb doffing mechanism 284 (Figures 22 and 23) comprises an endless element or sprocket chain 296 mounted on a pair of sprocket wheels 297, 298 rotatably mounted on the upper ends of respective vertically disposed shafts 301, 302. As best shown in Figures 23 and 24, the lower ends of the shafts 301, 302 are adjustably secured in respective frame members 303, 305 which extend inwardly and are suitably secured to the lower surface of the track 45. The hub of the gear 297 has a cog wheel integral therewith or fixed thereto having cogs 306, alternate cogs of which are engaged by the leading surfaces of the lowermost blocks 24 forming the pocket units 22 and the intervening cogs of which are engaged by the notches 283 in the pocket units to thereby drive the endless element or chain 296 at the same speed as that of the conveyor 21.

The chain 296 has a plurality of spaced outwardly projecting arms or auxiliary doffing bars 307 (Figures 22, 23 and 24) thereon which engage each successive bulb between corresponding jaws 200, 201 at substantially the time that each successive bulb occupies a position directly above and in alinement with a corresponding pocket unit 22 in the upper run of the conveyor 21. Thus, although the first stationary doffing bar 294 tends to retard forward movement of each successive bulb B engaged thereby, the auxiliary doffing bars or movable doffing bars 307 cause the bulb to be maintained in substantial alinement with the pocket units 22 so that, as each successive article turning, transferring and clamping device 20 moves out of engagement with the corresponding bulb, the bulb B then drops into the pocket 27 formed in the corresponding pocket unit 22.

Each pocket 27 has the resilient cushion member 310 (Figures 2, 3, 12 and 24) adhesively or otherwise secured in the bottom thereof and each of which is provided with a relatively small cavity 311 in the central portion thereof to accommodate the stem B-2 of the corresponding bulb B. The cushion members 310 discharge each successive bulb from the conveyor 21 at the discharging or planting station 47. The cushion member 310 in each pocket 27 being of a resilient material gives an ejecting action to the bulb to firmly press the same into the bottom of the furrow.

As heretofore stated, as the bulbs thus deposited in the pocket units 22 move with the conveyor 21 about the corresponding front conveyor supporting wheel 32, the arcuate runs of the bulb retaining endless belts 35 retain the bulbs in the pockets 27 and press them inwardly to thereby compress the corresponding resilient cushion member 310. This so positions the bulbs that they may slide onto the inclined chute portion 312 (Figures 8, 9 and 10) of the bottom run conveyor guide track 46 without being damaged thereby. The upper surface of the inclined chute 312 is preferably severally grooved longitudinally thereof as at 313 to minimize its frictional contact with the bulbs passing in engagement therewith. Opposite sides of the inclined chute 312 support portions of inner and outer lower track elements 314, 315 (Figure 10) which are of irregular configuration throughout their length as shown in Figure 8 and above which are spaced upper inner and outer guide elements 316, 317 to form a groove therebetween in which the opposite side portions of the plates 25 of successive pocket units are guided.

As heretofore stated, the lower end of the chute or inclined bottom wall 312 of the inclined track portion 46 terminates short of the lowermost portion of the bulb planting station 47 to form the opening 48 therein. The lower rearmost edge of the chute 312 of the inclined track portion 46 is preferably tapered to infinity as shown in Figure 8 to define a plurality of finger-like elements 312a (Figure 9), which serve to smooth the earth in the bottom of the furrow for the reception of the bulbs. The upper and lower guide elements 316, 317 and 314, 315, respectively, of the bulb planting station 47 are suitably secured to the proximal surfaces of vertically disposed plates 320, 321 whose lower edges are curved to conform substantially to the curvature of the track guides 314, 315 as shown in Figure 8. The opposed inner surfaces of the plates 320 and 321 as will be observed in Figures 11 and 17 are secured to relatively short vertically positioned frame members 129, 130 which are adjustably secured to the respective frame members 86, 87. It will be noted that the lowermost portions of the guides 314, 315 (Figures 6 and 8) are curved convexly to the earth or ground and their left-hand or rear portions curve upwardly and rearwardly concavely relative to the ground. Also the lower portions of the concavely curved portions of the lower track guides 314, 315 are provided with inwardly projecting ribs 322, 323 (Figures 8 and 9) so the lower run of the lowermost portion of the conveyor 21 is abruptly projected upwardly and rearwardly immediately rearwardly of the opening 48 by the ribs 322, 323.

Figures 7, 10:
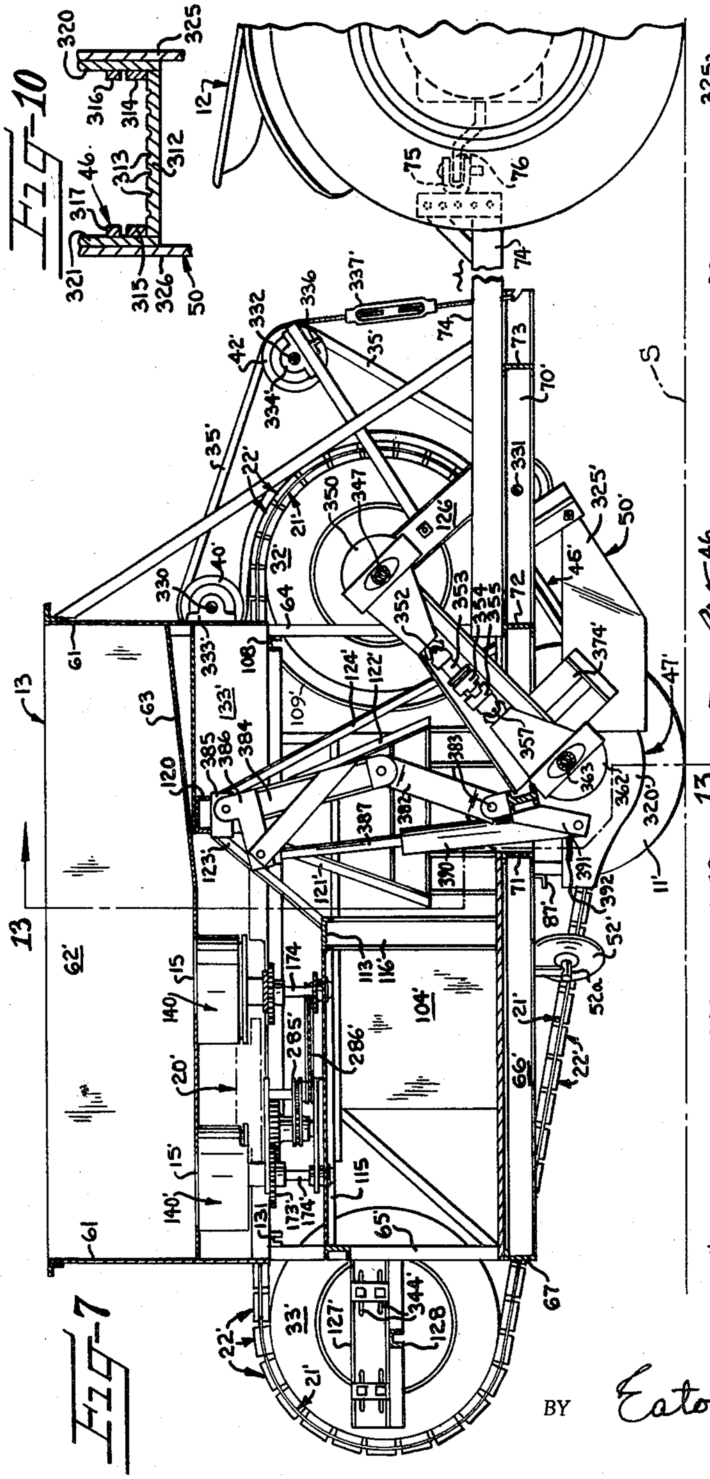
Figure 7 is a longitudinal vertical sectional view through the bulb planting machine taken substantially along line 7—7 in Figure 1 showing the frame and conveyor of the machine in raised position relative to the ground wheel.
Figure 10 is an enlarged transverse sectional view through the lower portion of the track for one of the conveyor belts taken substantially along line 10—10 in Figure 8.

The plow 50 comprises a pair of spaced plates 325, 326 whose rear portions are suitably secured to front opposite side portions of the respective bulb planting station side plates or side walls 320, 321 (Figures 9 and 10). The lower edges of the rear portions of the plow plates 325, 326 are preferably disposed on substantially the same or a slightly lower level than the lowermost edge of the inclined chute 312 at the bulb planting station 47 as will be observed in Figures 6 and 8. It will be observed in Figures 6, 7 and 8 that the front portions of the plow plates 325, 326 project upwardly at their lower edges and also, by referring to Figure 4, it is apparent that they also converge forwardly and their front ends are not only secured together but are also fixed to the lower end of a bracket or bar 327. The bar 327 (Figure 6) extends upwardly and rearwardly at an angle and is fixed to one side of the lower track assembly 46. Since both of the plows 50, 50' are identical, the same reference characters shall apply with the prime notation added to those parts associated with the plow 50'. The drive for the conveyors 21, 21' will be presently described.

Referring to Figures 1, 4, 6, 7 and 11, it will be observed that the sets of pulleys 40, 41, 42 and 40', 41', 42' on which the respective endless pressure applying belts 35, 35' are mounted are fixed on opposite ends of respective shafts 330, 331, 332. The shaft 330 is journaled in a pair of bearing blocks 333, 333' fixed on the front wall 60 of the hopper 13, the shaft 331 is journaled in the front portions of the front chassis frame members 70, 70', and the shaft 332 is journaled in a pair of spaced bearing blocks 334, 334' fixed on respective take-up arms 335, 335'.

The lower rear ends of the take-up arms 335, 335' are pivotally connected to the frame members 126, 126'

Figure 4:
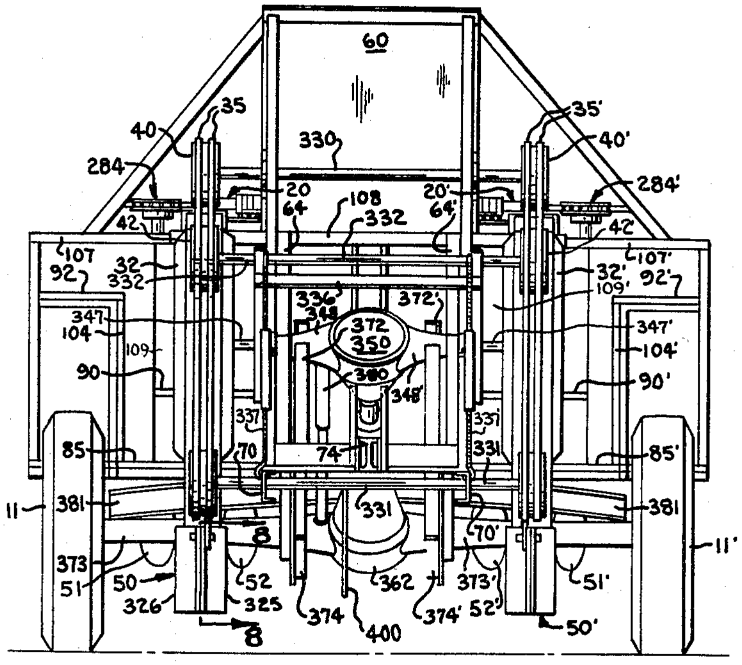
Figure 4 is a front elevation of the improved bulb planter looking at the right-hand side of Figure 1.
Figure 5:
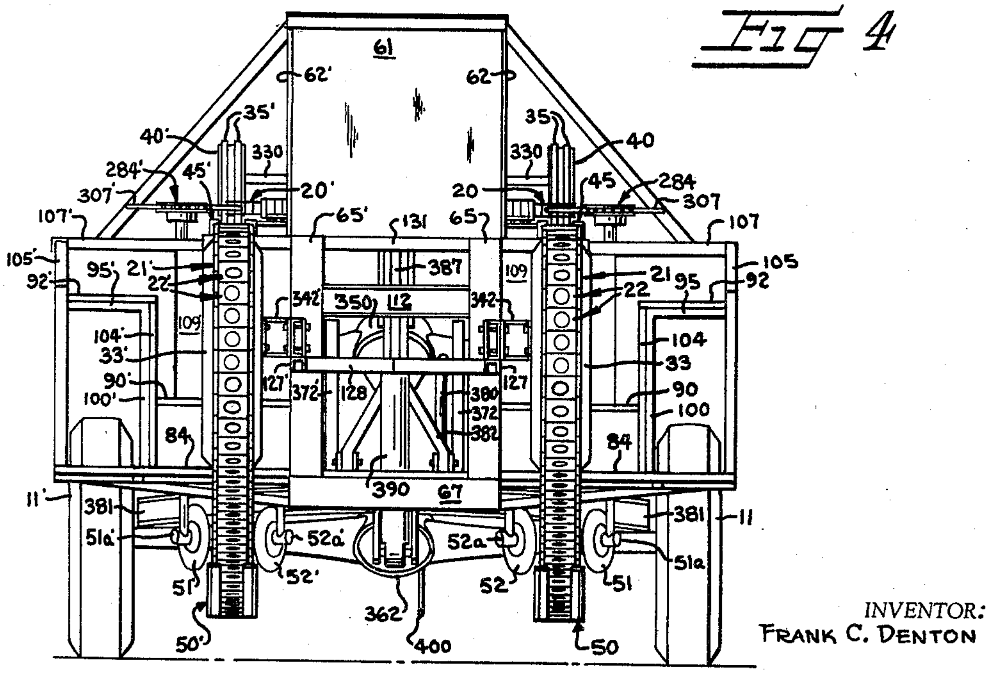
Figure 5 is a rear elevation of the bulb planter looking at the left-hand side of Figure 1.

(Figures 6 and 11) and their upper ends are preferably spanned by a reinforcing frame member or bar 336 (Figures 4 and 7). The free end of each take-up bar 335, 335' has adjustable links 337, 337' respectively, pivotally connected thereto, the lower ends of the links 337, 337' being connected to the corresponding chassis frame members 70, 70'. The adjustable links 337, 337' are provided to take up and maintain tension in the endless belts 35, 35'.

*Conveyor driving means and mounting for retractable wheels*

As a preamble to the disclosure of the mounting for the endless conveyors 21, 21', it might be stated that the mounting means for the conveyors 21, 21' is so arranged that the conveyors may be moved inwardly and outwardly by adjusting the various parts associated therewith and it is apparent that the lower ends of the shafts 301, 302 (Figures 22, 23 and 24) are adjustably mounted in the frame members 303, 305 for this purpose. Also, the arm or bar 154, as will be observed in Figure 22, is so arranged as to facilitate adjustment of the turret plate 157 and its corresponding series of article grasping, transferring and turning devices 20 toward and away from the conveyors 21 in accordance with any adjustments made therein. It will be noted in Figure 22 that one end of the bar 154 receives the shaft 174 on which the star wheel 16 is mounted. Therefore, the turret plate 157 when adjusted will remain in proper operating position to the star wheel 16. Since the mountings for the rear conveyor supporting wheels 33, 33' are substantially the same, except being opposite hand, only the mounting for the rear conveyor supporting wheel 33 will be detailed (Figure 16) and like parts where shown associated with the rear conveyor supporting wheel 33' will bear the same reference characters with the prime notation added.

The rear wheel 33 (Figure 16) is an idler and is journaled on an axle 340 whose inner end is fixed to a plate 341 removably secured to a block 342. The block 342 is, in turn, removably secured to the rear conveyor wheel supporting frame member 127 (Figure 15) by means of bolts 343, which bolts 343 penetrate adjustment slots 344 in the frame member 127. The block 342 may be replaced by blocks of varying width to correspondingly vary the displacement between the conveyors 21, 21'. On the other hand, the block 342 may be adjusted longitudinally of the frame member 127 to maintain the conveyor 21 under proper tension.

The frame members 129, 130 as previously stated are adjustably secured to the frame members 86, 87 (Figure 17) to permit the bulb planting station 47 to be moved inwardly or outwardly to obtain the desired distance between rows of bulbs.

The front conveyor support wheels 32, 32' are keyed for longitudinal adjustment on respective axles 347, 347' (Figures 11 and 17) which are journaled in axle housings 348, 348' (Figure 1) and the proximal ends of the axles 347, 347' are connected to a suitable gear housing 350 containing suitable differential gearing, not shown, but being of usual construction. The differential gear housing 350 (Figure 18) also has a shaft 351 projecting rearwardly and downwardly therefrom which is coupled to the axles 347, 347' by said gearing in the housing and which is also coupled by means of a universal joint 352 (Figures 17 and 18) to a tubular shaft 353 having a clutch element 354 keyed thereon for longitudinal movement. A suitable restraining means such as a pin 358 is secured to the lower end of the tubular shaft 353 and has one end extending out beyond the surface of the shaft 353 for engaging a shoulder of the clutch element 354 and fixing the lowermost position of the clutch element 354. During operation of the machine, the clutch element 354 meshes with a mating clutch element 355 fixed on a shaft 356 journaled in the tubular shaft 353. The lower end of shaft 356 is coupled, as by a universal joint 357, to a shaft 360 which projects rearwardly from the universal joint 357. The shaft 360 is journaled in a rear differential gear housing 362 containing suitable gearing coupling the shaft 360 with a pair of axles 363, 363' which carry the ground wheels 11, 11'.

The clutch element 354 is engaged by a yoke 365 (Figure 17) which is guided on a rod or a bar 366 suitably mounted on the differential gearing housings 350, 362 and which is normally urged to clutch engaging position by a spring 367 mounted on the bar or rod 366 when the planting station 47 is in lowered or bulb planting position as shown in Figure 11.

The yoke 365 has one end of a cable or pliable element 370 connected thereto which may lead to a point adjacent the seat of the tractor so the clutch 354, 355 may be engaged and disengaged at the will of the operator. It will be observed in Figures 4 and 17 that the axle housings 348, 348' are engaged by the bifurcated upper ends of built-up A-frame members 372, 372' whose diverging lower portions are connected to axle housings 373, 373' projecting outwardly from opposite sides of the rear or lower differential gear housing 362. The lower portions of the A-frame members 372, 372' have respective built-up substantially vertically positioned channel-shaped guides 374, 374' suitably secured thereto and depending therefrom which are engaged by respective stabilizing wheels 376, 376' (Figures 6, 11 and 17) suitably journaled on the surfaces of the front lower chassis frame members 70, 70', respectively. The stabilizing wheels 376, 376' moving in the channel-shaped guides 374, 374' control the distance that the clutch member 355 moves away from the clutch member 354 to disengage the same when the frame 10 is in raised position as shown in Figures 7 and 17. An inspection of Figure 11 will disclose that varying the angle of the channel-shaped members 374, 374' in relation to the A-frame members 372, 372' will vary the distance that the clutch member 355 moves away from clutch member 354 when the frame 10 is elevated to inoperative position. The stabilizing wheels 376, 376' by being confined by the rectilinear channel-shaped guides 374, 374' in which they move maintain the movement of the frame 10 in a straight rather than arcuate path when the same is elevated or lowered.

The axle housings 348, 348' are suitably secured as by brackets or inverted U-shaped clamps 377, 377' (Figures 1, 4 and 17) to the horizontal rear portions or upper portions of the frame members 126, 126'. A stabilizing telescoping shaft 380 (Figure 4 and 17) is connected at one end thereof to the axle housing 348 and its lower end is connected to the axle housing 373. Extending longitudinally of and above the axle housings 373, 373' and also being bowed upwardly over the lower or rear differential gearing housing 362 is a rigid frame member or I-beam 381 (Figures 4 and 17) which may be welded or otherwise secured to the axle housings 373, 373' and the rear housing 362.

As best shown in Figure 17, the transverse frame member, which is utilized for connecting the ground wheel retracting mechanism has the lower end of a substantially A-shaped frame or link 382 pivotally connected thereto as at 383 and 383'. The two legs of the inverted V-shaped or A-shaped link 382 converge upwardly and are pivotally connected to a composite link 384 whose upper end is pivotally connected to a block 385 (Figures 7, 11, 13 and 17) which is suitably secured to and depends from the lower surface of the apex of the inverted V-shape frame member 120. The upper portion of the link 384 (Figures 7, 11 and 17) has a pair of rearwardly projecting arms 386 thereon between which the upper end of a piston rod 387 is pivotally mounted. The piston rod 387 extends downwardly into a cylinder 390 whose lower end is pivotally mounted between a pair of brackets 391 which extend upwardly and forwardly at an angle and are suitably secured to the frame member or I-beam 381.

A double action cylinder may be used, however, a single acting cylinder is shown in this instance wherein a conduit or flexible pipe 392 (Figure 11) is coupled to the lower end of the cylinder 390 and extends to the usual hydraulic fluid pressure system and valves, not shown, associated with the tractor 12. It is apparent that admitting fluid pressure into the lower end of cylinder 390 causes piston rod 387 to move upwardly to move the parts from say, the position shown in Figure 11 to that shown in Figure 7 or, in other words, to raise the frame 10 and all parts supported thereby relative to the ground wheels 11, 11′, said ground wheels 11, 11′ being journaled on opposite ends of the axles 363, 363′. Conversely, when fluid pressure is released from the lower end of the cylinder 390, the wheels 11, 11′ are retracted relative to the frame 10 to thereby lower the bulb planting stations 47, 47′ into the soil a predetermined distance. This distance is determined by the length of stroke of the piston rod 387 and may readily be varied by merely positioning a sleeve of desired length around the piston rod 387 to thereby reduce its effective stroke. Of course, the usual controls of the tractor may be utilized for controlling the amount of fluid pressure in the cylinder 390 to limit inward movement of the piston rod 387 to correspondingly reduce the depth of the furrow F formed by the plows 50, 50′.

Figure 14:
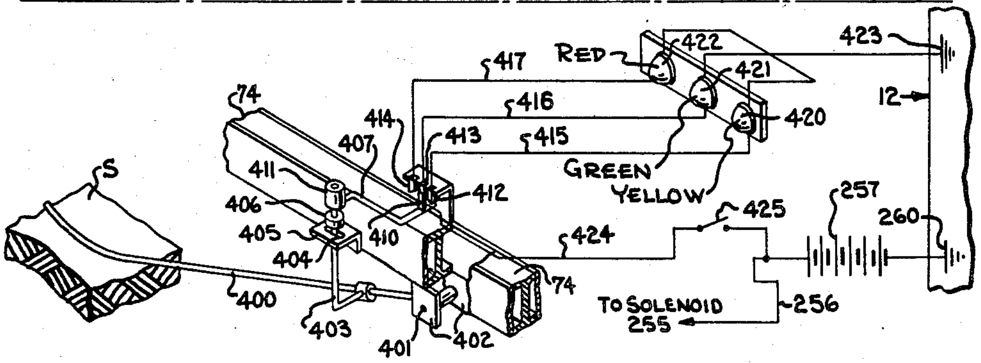
Figure 14 is a schematic view showing means for controlling the flow of current for signals which indicate that the furrow is being made of the proper depth.

In order that an operator may be aware of the depth of the furrows formed by the plows 50, 50′ while operating the tractor 12, it is preferable that an adjustable depth indicator be utilized such as that shown in Figures 11 and 14. The depth gauge or indicating device comprises a wand or feeler arm 400 whose free end is rounded and adapted to ride upon the surface of the earth or soil adjacent the plows 50, 50′. The upper forward end of the feeler arm 400 is pivotally connected, as at 401 between a pair of ears 402 depending from the tongue 74. One end of a substantially L-shaped rod or member 403 is fixed to a medial portion of the feeler arm or rod 400 and extends upwardly and loosely penetrates a slot 404 formed in a bracket 405 projecting outwardly from the tongue 74. The vertical leg of the L-shaped rod or member 403 has a collar or abutment 406 fixed thereon for limiting downward movement of the feeler arm 400 when the ground wheels 11, 11′ are in lowered position relative to the frame 10.

The upper end of the vertical leg of the L-shaped member 403 has one end of a substantially Z-shaped switch actuating member 407 fixed thereto which overlies the tongue 74 and has a brush 410 fixed thereto and projecting upwardly therefrom. The Z-shaped member 407 is insulatably secured to the upper end of the vertical leg of the L-shaped member 403 by an insulation collar or sleeve 411. The brush 410 is adapted to engage any one of three spaced armatures or contacts 412, 413, 414 depending upon the position of the feeler arm 400. The contacts or armatures 412, 413, 414 have respective conductors or wires 415, 416, 417 leading therefrom to respective signals which are shown in the form of yellow, green and red incandescent lamps 420, 421, 422, respectively, and which are grounded as at 423 to the tractor 12. Although the incandescent lamps 420, 421, 422 may be conveniently located on some stationary part of the improved planter, they are preferably located on a stationary part of the tractor 12 where they may be readily viewed by the operator of the tractor. The Z-shaped member 407 has a conductor or wire 256 which is connected to a battery 257. A suitably manually operable switch 425 is interposed between the conductor 424 and conductor 256. The switch 425 is also preferably located to be conveniently accessible to the operator of the tractor 12. In operation, the depth indicator functions as follows:

When the distance between the upper surface of the soil S and the frame 10 is proper in accordance with the bite of the plows 50, 50′ in forming a furrow of the desired depth, the brush 410 contacts the armature 413 to energize the green lamp 421. However, if the plows tend to form a furrow of too great a depth, this rocks the wand or feeler arm 400 in engagement with the earth S causing the same to move in a clockwise direction in Figure 14 to move the brush 410 out of engagement with armature 413 and into engagement with armature 412 thereby energizing the yellow lamp 420. On the other hand, if the depth of the furrow cut by the plows 50, 50′ is insufficient, this tends to rock the wand or feeler arm 400 in a counterclockwise direction in Figure 14 to correspondingly move the Z-shaped arm 407 so the brush 410 engages the armature 414 thereby energizing the red lamp 422. The L-shaped member 403 may be adjusted along the feeler arm 400 in order to predetermine the depth of furrows to be formed by the plows 50, 50′ at which the contact or brush 410 would engage the armature 413 and energize the green lamp 421.

Although the hydraulic pressure system and battery of the tractor are used for operating the piston rod 387 (Figure 7), the solenoid 255 (Figures 29 and 30) and the incandescent lamps 420, 421, 422 and, although the tractor 12 is used as means for imparting movement to the improved planter, it is to be distinctly understood that the improved planter may be provided with its own means for imparting movement thereto and its own hydraulic and electrical systems without departing from the spirit of the invention. Since the hydraulic system of a tractor is well known and may be readily adapted to the present invention, a detailed disclosure thereof is deemed unnecessary.

It is thus seen that I have provided an improved planter particularly adapted for planting botanical bulbs B comprising the conveyors 21, 21′ which may be raised and lowered relative to the ground wheels 11, 11′ for transporting the planter from one place to another and wherein means are provided for automatically feeding bulbs from the hopper 13 to the conveyors, one at a time, and accurately position the bulbs in the pockets 27, 27′ of the conveyors while also automatically inverting any bulbs which require such inversion so that the stems of all of the bulbs face downwardly as they are initially deposited in the upper runs of the conveyors 21, 21′.

It will also be noted that the ground wheels 11, 11′ are the sole means for imparting rotation to the conveyors 21, 21′ and all other operating parts are, in turn, controlled by the rate of movement of the conveyors. It is apparent that the bulbs are retained in the pockets 27, 27′ in the corresponding conveyors 21, 21′ by the sets of bulb retaining belts 35, 35′ and by the inclined chute 312, 312′ adjacent the bulb planting stations 47, 47′. As the bulbs reach the lowermost portion of the lower reaches or runs of the endless conveyors 21, 21′, the cushion members 310 (Figures 2, 3 and 12) will force the bulbs outwardly so they are properly positioned in uniformly spaced relation in the bottom of the furrows F formed by the plows 50, 50′ and after which the furrows are covered by the furrow covering disks 51, 52, 51′, 52′.

In the drawings and specification there has been set forth a preferred embodiment of the invention and although specific terms are employed, they are used in a generic and descriptive sense only, and not for purposes of limitation, the scope of the invention being defined in the claims.

I claim:

1. Apparatus for planting botanical bulbs each having a stem on one side thereof comprising a frame, at least two wheels supporting said frame for movement along the ground, front and rear conveyor supporting wheels mounted on said frame, at least one endless conveyor mounted on said conveyor supporting wheels and having a plurality of spaced pockets in the outer surface thereof each for receiving a bulb therein with movement of the pockets with the upper run of the conveyor, means responsive to rotation of the ground wheels for imparting corresponding rotation to at least one of the conveyor supporting wheels and, thus, to the endless conveyor, means to retain the bulbs in said pockets during movement of the conveyor in engagement with the corresponding front wheel, means to guide the conveyor and deflect the lower run thereof downwardly out of its normal path of travel between the front and rear wheels, the latter means having an opening therein at its lowermost portion and thereby also serving to retain bulbs in the pockets of the conveyor and to permit the bulbs to move from the lowermost portion of the conveyor onto the ground.

2. A structure according to claim 1 including a bulb hopper mounted in the upper portion of said frame, bulb transferring means driven in timed relation to said conveyor and being positioned between said hopper and said conveyor for successively moving bulbs from the hopper to the pockets of said conveyor, and said bulb transferring means comprising means operable automatically during the transferring of the bulbs from the hopper to the pockets of the conveyor for automatically inverting any bulbs whose stems face upwardly when they are initially received from the hopper to thereby position them properly when they are deposited in the pockets.

3. A structure according to claim 1 including a bulb hopper having at least one discharge opening therein, and means for transferring bulbs from the hopper to the pockets of the conveyor comprising a star wheel having a plurality of notches in its periphery and mounted on a substantially vertical axis below the discharge opening of the hopper, means to guide the bulbs into the notches in said star wheel, means to drive said star wheel in timed relation to said conveyor, a rotatable turret mounted on a vertical axis between the star wheel and the conveyor and having a plurality of circular spaced article grasping devices thereon, each of the article grasping devices comprising a pair of jaws adapted to successively aline with successive notches in the star wheel, means to drive said turret in timed relation to movement of said conveyor, the path of movement of said jaws also extending above the pockets on said conveyor, the jaws of each grasping device normally being biased toward each other, means to separate said jaws as they aline with notches in the star wheel to thereby receive a corresponding bulb therebetween, and whereby the jaws subsequently clamp a bulb therebetween and means to doff the bulbs from between the jaws of the grasping devices as they aline with the pockets in the conveyor whereby each successive bulb drops into a pocket in the conveyor.

4. A structure according to claim 3 including means operable automatically upon a bulb being received between any one of the pairs of jaws with its stem projecting upwardly for automatically imparting substantially one-half a revolution to the corresponding pair of jaws in the course of its movement from the star wheel to the conveyor to thereby insure that the stem portions of all the bulbs extend downwardly in the pockets as the pockets move with the upper run of the conveyor.

5. A structure according to claim 3 wherein said means for driving the turret comprises a plurality of circularly spaced outwardly projecting cogs on said turret, and said conveyor having a plurality of notches therein adapted to successively engage the cogs carried by said turret to thereby impart movement to the turret in timed relation to movement of the conveyor.

6. A structure according to claim 3 wherein said means for driving the star wheel includes a shaft supporting said star wheel for rotation, a gear mounted on said shaft in fixed relation with said star wheel and gear means connecting the first-named gear with said turret.

7. Apparatus for planting botanical bulbs comprising a frame having ground wheels adapted to be moved along the ground, spaced apart front and rear conveyor supporting wheels mounted on said frame, at least one pliable endless conveyor trained over said conveyor supporting wheels, means to drive the conveyor, a series of spaced bulb receiving means on said conveyor, each for receiving a single bulb therein, means to guide the conveyor and to deflect the lower run thereof downwardly out of its normal path of travel in close proximity to the ground, and means retaining the bulbs in said bulb receiving means, and said bulb retaining means permitting each successive bulb to move out of the corresponding bulb receiving means at the lowermost portion of the lower run of the conveyor.

8. Apparatus for planting botanical bulbs each having a stem on one side thereof comprising a frame, at least two ground wheels supporting said frame for movement along the ground, pairs of front and rear conveyor supporting wheels mounted on opposite sides of said frame, conveyors mounted on said conveyor supporting wheels and having a plurality of spaced pockets in the outer surface thereof each for receiving a bulb therein with movement of the pockets with the upper run of the conveyors, means responsive to rotation of the ground wheels for imparting corresponding rotation to at least one of the pairs of conveyor supporting wheels and, thus, to the endless conveyors, means to retain the bulbs in said pockets during movement of the conveyors in engagement with the corresponding front wheels, means to guide each of the conveyors and deflect the lower runs thereof downwardly out of their normal path of travel between the pairs of front and rear wheels, the latter means having an opening therein at its lowermost portion and thereby also serving to retain bulbs in the pockets of the conveyors and to permit the bulbs to move from the lowermost portion of the conveyors onto the ground.

9. A structure according to claim 8 including a bulb hopper mounted in the upper portion of said frame, bulb transferring means driven in timed relation to said conveyors and being positioned between said hopper and said conveyors for successively moving bulbs from the hopper to the pockets of said conveyors, and said bulb transferring means comprising means operable automatically during the transferring of the bulbs from the hopper to the pockets of the conveyors for automatically inverting any bulbs whose stems face upwardly when they are initially received from the hopper to thereby position them properly when they are deposited in the pockets.

10. A structure according to claim 8 including a bulb hopper having a pair of discharge openings therein, and means for transferring bulbs from the hopper to the pockets of each of the conveyors comprising star wheels each having a plurality of notches in its periphery and being mounted on a substantially vertical axis below the corresponding discharge opening of the hopper, means to guide the bulbs into the notches in said star wheels, means to drive said star wheels in timed relation to said conveyors, rotatable turrets each being mounted on a vertical axis between the star wheels and the conveyors and having a plurality of circular spaced article grasping devices thereon, each of the article grasping devices comprising a pair of jaws adapted to successively aline with successive notches in a corresponding star wheel, means to drive said turrets in timed relation to movement of said conveyors, the path of movement of said jaws also extending above the pockets on said conveyors, the jaws of each grasping device normally being biased toward each other, means to separate said jaws as they aline with notches in the star wheels to thereby receive a corresponding bulb therebetween, and whereby the jaws subsequently clamp a bulb therebetween and means to doff the bulbs from between the jaws of the grasping devices as they aline with the pockets in the conveyors whereby each successive bulb drops into a pocket in the conveyors.

11. A structure according to claim 10 including means operable automatically upon a bulb being received between any one of the pairs of jaws with its stem projecting upwardly for automatically inparting substantially one-half a revolution to the corresponding pair of jaws in the course of its movement from one of said star wheels to the corresponding conveyor to thereby insure that the stem portions of all the bulbs extend downwardly in the pockets as the pockets move with the upper run of the conveyors.

12. A structure according to claim 10 wherein said means for driving said turrets comprises a plurality of circularly spaced outwardly projecting cogs on said turrets and said conveyors having a plurality of notches therein adapted to successively engage the cogs carried by said turrets to thereby impart movement to the turrets in timed relation to movement of the conveyors.

13. A structure according to claim 10 wherein said means for driving the star wheels includes a shaft supporting each star wheel for rotation, a gear mounted on each shaft in fixed relation with the corresponding star wheel and gear means connecting the first-named gear with the corresponding turret.

14. Apparatus for planting botanical bulbs each having a stem on one side thereof comprising a frame, at least two wheels supporting said frame for movement along the ground, front and rear conveyor supporting wheels mounted on said frame, at least one endless conveyor mounted on said conveyor supporting wheels and having a plurality of spaced pockets in the outer surface thereof each for receiving a bulb therein with movement of the pockets with the upper run of the conveyor, the bottoms of said pockets comprising resilient means for resiliently supporting the bulbs, means responsive to rotation of the ground wheels for imparting corresponding rotation to at least one of the conveyor supporting wheels and, thus, to the endless conveyor, means to compress the resilient means of said pockets and to retain the bulbs in said pockets in their placed relation during movement of the conveyor in engagement with the corresponding front wheel, means to guide the conveyor and deflect the lower run thereof downwardly out of its normal path of travel between the front and rear wheels, the latter means also serving to retain bulbs in the pockets of the conveyor and to permit the bulbs to move from the lowermost portion of the conveyor onto the ground.

15. A structure according to claim 14 including a bulb hopper mounted in the upper portion of said frame, bulb transferring means driven in timed relation to said conveyor and being positioned between said hopper and said conveyor for successively moving bulbs from the hopper to the pockets of said conveyor, and said bulb transferring means comprising means operable automatically during the transferring of the bulbs from the hopper to the pockets of the conveyor for automatically inverting any bulbs whose stems face upwardly when they are initially received from the hopper to thereby position them properly when they are deposited in the pockets.

16. A structure according to claim 14 including a bulb hopper having at least one discharge opening therein, and means for transferring bulbs from the hopper to the pockets of the conveyor comprising a star wheel having a plurality of notches in its periphery and mounted on a substantially vertical axis below the discharge opening of the hopper, means to guide the bulbs into the notches in said star wheel, means to drive said star wheel in timed relation to said conveyor, a rotatable turret mounted on a vertical axis between the star wheel and the conveyor and having a plurality of circular spaced article grasping devices thereon, each of the article grasping devices comprising a pair of jaws adapted to successively aline with successive notches in the star wheel, means to drive said turret in timed relation to movement of said conveyor, the path of movement of said jaws also extending above the pockets on said conveyor, the jaws of each grasping device normally being biased toward each other, means to separate said jaws as they aline with notches in the star wheel to thereby receive a corresponding bulb therebetween, and whereby the jaws subsequently clamp a bulb therebetween and means to doff the bulbs from between the jaws of the grasping devices as they aline with the pockets in the conveyor whereby each successive bulb drops into a pocket in the conveyor.

17. A structure according to claim 16 including means operable automatically upon a bulb being received between any one of the pairs of jaws with its stem projecting upwardly for automatically imparting substantially one-half a revolution to the corresponding pair of jaws in the course of its movement from the star wheel to the conveyor to thereby insure that the stem portions of all the bulbs extend downwardly in the pockets as the pockets move with the upper run of the conveyor.

18. A structure according to claim 16 wherein said means for driving the turret comprises a plurality of circularly spaced outwardly projecting cogs on said turret, and said conveyor having a plurality of notches therein adapted to successively engage the cogs carried by said turret to thereby impart movement to the turret in timed relation to movement of the conveyor.

19. A structure according to claim 16 wherein said means for driving the star wheel includes a shaft supporting said star wheel for rotation, a gear mounted on said shaft in fixed relation to said star wheel and gear means connecting the first-named gear with said turret.

20. Apparatus for planting bulbs each having a stem extending therefrom comprising a wheeled frame adapted to be pulled over the ground, at least one conveyor carried by said frame and having bulb receiving pockets therein, means for driving said conveyor, a bulb hopper mounted on said frame, and means for transferring bulbs from said hopper into the pockets of the conveyor, said last recited means comprising inverted means for grasping the bulbs and positioning the bulbs in the pockets of the conveyor with their stems facing downwardly.

References Cited in the file of this patent

UNITED STATES PATENTS

| | | |
|---|---|---|
| 342,490 | Zimmerman | May 25, 1886 |
| 752,661 | Dyer | Feb. 23, 1904 |
| 858,201 | McCoy | June 25, 1907 |
| 1,453,923 | De Young | May 1, 1923 |
| 1,592,250 | Yerkes | July 13, 1926 |
| 1,895,962 | Bateman et al. | Jan. 31, 1933 |
| 2,141,044 | Rassman | Dec. 20, 1938 |
| 2,462,276 | Mueller | Feb. 22, 1949 |
| 2,660,288 | Hansen | Nov. 24, 1953 |

FOREIGN PATENTS

| | | |
|---|---|---|
| 538,037 | Germany | Nov. 9, 1931 |
| 814,343 | Germany | Sept. 20, 1951 |
| 826,525 | Germany | Jan. 3, 1952 |
| 847,367 | Germany | Aug. 25, 1952 |
| 599,501 | Great Britain | Mar. 15, 1948 |

OTHER REFERENCES

Publications:

The Wise Garden Encyclopedia, SB45S4, 1951, only pages 183, 184 and 186–188 are required.

The Gardener's Assistant by Thompson, SB406T47, 1878, only page 255 required.

UNITED STATES PATENT OFFICE

CERTIFICATE OF CORRECTION

Patent No. 2,935,957 May 10, 1960

Frank C. Denton

It is hereby certified that error appears in the printed specification of the above numbered patent requiring correction and that the said Letters Patent should read as corrected below.

Column 22, line 72, for "inparting" read -- imparting --; column 24, line 38, for "inverted" read -- inverting --.

Signed and sealed this 4th day of October 1960.

(SEAL)

Attest:

KARL H. AXLINE
Attesting Officer

ROBERT C. WATSON
Commissioner of Patents